(12) United States Patent
Johnston et al.

(10) Patent No.: US 6,323,285 B1
(45) Date of Patent: *Nov. 27, 2001

(54) HETEROMORPHIC POLYMER COMPOSITIONS

(75) Inventors: Robert T. Johnston, Lake Jackson; Evelyn J. Morrison, Oyster Creek; Debra J. Mangold; Thoi H. Ho, both of Lake Jackson, all of TX (US)

(73) Assignee: The Dow Chemical Company, Midland, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/004,442

(22) Filed: Jan. 9, 1998

(51) Int. Cl.$^7$ .............................. C08L 23/04; C08L 23/08
(52) U.S. Cl. ............................................. 525/242; 525/240
(58) Field of Search ...................... 525/242, 240

(56) References Cited

U.S. PATENT DOCUMENTS

| | | | |
|---|---|---|---|
| 3,236,917 | 2/1966 | Natta et al. | 525/285 |
| 3,299,177 | 1/1967 | Reding et al. | 525/52 |
| 3,645,922 | 2/1972 | Weiss et al. | 526/169.2 |
| 4,076,698 | 2/1978 | Anderson et al. | |
| 4,798,081 | 1/1989 | Hazlitt et al. | |
| 4,937,299 | 6/1990 | Ewen et al. | |
| 4,950,541 | 8/1990 | Tabor et al. | |
| 5,089,321 | 2/1992 | Chum et al. | |
| 5,194,509 | 3/1993 | Hasenbein et al. | |
| 5,218,071 | 6/1993 | Tsutsui et al. | |
| 5,272,236 | 12/1993 | Lai et al. | |
| 5,272,278 | 12/1993 | Wuetz. | |
| 5,278,272 | 1/1994 | Lai et al. | |
| 5,346,963 | 9/1994 | Hughes et al. | |
| 5,530,072 | 6/1996 | Shirodkar. | |
| 5,773,155 | * 6/1998 | Kale et al. | 525/240 |

FOREIGN PATENT DOCUMENTS

| | | |
|---|---|---|
| 222376 | 1/1981 | (EP). |
| 416 815A | 8/1990 | (EP). |
| WO 93/08221 | 4/1993 | (WO). |
| 94/17112 | 8/1994 | (WO). |

OTHER PUBLICATIONS

Wild et al., *Journal of Polymer Science,* Poly Phys. Ed., vol. 20, pp. 441–455 (1982).
Williams and Ward, *Journal of Polymer Science,* Polymer Letters, vol. 6, pp. 621–624 (1968).
Randall (Rev. Macromol. Chem. Phys., C. 29, V. 2&3, pp. 285–297).
Zimmn, G. H. and Stockmayer, W. J., J. Chem. Phys., 17, pp. 1301–1314 (1949).
U.S. Ser. No. 784,683, Finlayson et al., filed Jan. 22, 1997.
Rudin, A., *Modern Methods of Polymer Characterization,* John Wiley & Sons, New York, pp. 103–112 (1991).
A. Willem deGroot and P. Steve Chum, The Dow Chemical Company, Presentation at the Federation of Analytical Chemistry and Spectroscopy Society (FACSS), St. Louis, Missouri, Oct. 4, 1994 Conference.
M. Shida, R. N. Shroff and L. V. Cancio, *Polymer Engineering Science,* vol. 17, No. 11, pp. 769–774 (1977).
John Dealy, "Rhoemeters for Molten Plastics," Van Nostrand Reinhold Co., pp. 97–99 (1982).
S. Lai and G. W. Knight, ANTEC '93 Proceedings, Dow Constrained Geometry Catalyst Technology (CGCT)—New Rules for Ethylene α–Olefins Interpolymers–Controlled Rheology Polyolefins, New Orleans, LA, May 1993.
Ramamurthy, *Journal of Rheology,* 30(2), pp. 337–357, 1986.

* cited by examiner

*Primary Examiner*—James J. Seidleck
*Assistant Examiner*—Olga Asinovsky

(57) ABSTRACT

The subject invention pertains to heteromorphic polymer compositions characterized as comprising: (a) a homogeneous linear or substantially linear ethylene/α-olefin interpolymer backbone; and (b) a branch appending from the backbone, which branch comprises an ethylene homopolymer or ethylene/α-olefin interpolymer having a density which is at least 0.004 g/cm$^3$ greater than that of the backbone. At least one of the backbone polymer or the branch polymer may be optionally functionalized to promote adhesion to polar surfaces. The heteromorphic polymer compositions of the invention exhibit enhanced upper service temperature. Also disclosed is a process for preparing the heteromorphic polymer compositions of the invention.

16 Claims, 8 Drawing Sheets

HETEROMORPHIC POLYMER COMPOSITIONS

FIELD OF THE INVENTION

The subject invention pertains to heteromorphic olefin polymers. In particular, the subject invention pertains to olefin polymers comprising a homogeneously branched linear or substantially linear ethylene/α-olefin interpolymer backbone, and a higher density ethylene homopolymer or ethylene/α-olefin interpolymer long chain branch appending from the interpolymer backbone.

BACKGROUND OF THE INVENTION

Homogeneous ethylene/α-olefin interpolymers are characterized by narrow molecular weight distributions and narrow short-chain branching distributions. Further, homogeneous ethylene interpolymers containing long-chain branches, known as "substantially linear" ethylene polymers, are disclosed and claimed in U.S. Pat. No. 5,272, 236 and in U.S. Pat. No. 5,278,272, each of which is incorporated herein by reference.

The absence of low molecular weight, waxy components and the ability to evenly distribute comonomer has enabled the production of high quality elastomers, such as ethylene/propylene, ethylene/butene, and ethylene/octene elastomers, etc. However, as homogeneous linear and substantially linear ethylene polymers lack the highly linear fraction characteristic of heterogeneously branched polyethylene (and thus the high crystalline melting peak), homogeneous linear and substantially linear ethylene polymers tend to have a poorer high temperature resistance, especially when the polymer density is less than 0.920 g/cm$^3$, than heterogeneously branched polymers of the same density. For instance, homogeneous linear and substantially linear elastomers may lose their strength at 60° C. or less. This has been attributed to the fact that such low density polymers have a molecular structure which is characterized by the presence of fringed micelles, and typically lacks higher melting point lamellar structures. While the differential is less pronounced, even higher density homogeneous linear and substantially linear ethylene polymers which have lamellae structures, generally melt at lower temperatures than their heterogeneously branched counterparts. Regardless of polymerization catalyst, polyethylenes face a practical use limitation above their crystalline melting point, which does not exceed approximately 140° C.

Through blending high crystallinity grades of polyethylene with low crystallinity elastomeric grades, it is possible to raise the use temperature of the elastomeric grades. However, greater improvements in high temperature resistance are desired. Further, generally speaking, however, as the amount of the higher density fraction increases, the high temperature resistance increases, while the modulus increases (and thus, the elastomeric properties, in the case of blends with homogeneous linear or substantially linear ethylene polymers having a density less than 0.900 g/cm$^3$, undesirably decreases). In the case of blends with homogeneous linear and substantially linear ethylene polymers having a density greater than 0.900 g/cm$^3$, as the amount of the higher density fraction increases, the high temperature resistance increases, while the tear resistance and impact resistance undesirably decrease.

U.S. Pat. No. 5,530,072 discloses polymers exhibiting long chain branching formed by self-grafting a linear polyethylene using a free radical initiator. While such self-grafting serves to increase the molecular weight of the polyethylene and to improve the melt strength, it does not affect the crystallinity of the polyethylene, and thus does not affect the high temperature resistance of the polyethylene.

U.S. Pat. No. 5,346,963 discloses graft modified substantially linear ethylene polymers, which are optionally blended with thermoplastic polymers, such as high density polyethylene, linear low density polyethylene, and low density polyethylene.

Industry would find advantage in an elastomer which has enhanced high temperature performance without sacrifice of modulus and/or tear resistance and impact resistance. Such enhanced high temperature performance may show advantage, for instance, in shoe soles which better withstand the heat of a clothes dryer. In another embodiment, such enhanced high temperature performance may show advantage, for instance, in pressure sensitive adhesives which exhibit reduced creep resistance.

BRIEF DESCRIPTION OF THE DRAWINGS

Preferred embodiments of the invention are described below with reference to the following accompanying drawings, which form a part of this specification and are for illustrative purposes only. These drawings are not to be used to improperly limit the scope of the invention that may have other equally effective or legally equivalent embodiments.

FIGS. 2A(a) depicts a substantially linear ethylene α-olefin copolymer backbone with a polymer branch resulting from an "H-link" whith a backbone polymer.

FIGS. 2A(b) depicts a long-chain branch linking to the backbone polymer at two positions.

FIGS. 2A(c) depicts a long chain branch linking to form a "T"-connection with the backbone polymer.

FIGS. 2B–A illustrates a heteromorphic polymer composition where a linear ethylene/α-olefin copolymer backbone has variations of "T"-type heteromorphic long chain branches.

DESCRIPTION OF THE INVENTION

As used herein, the term "polymer" means a compound prepared by polymerizing monomers, whether of the same or a different type. The generic term polymer thus embraces the term "homopolymer", usually employed to refer to polymers prepared from only one type of monomer, and the term "interpolymer", as defined hereinafter.

The term "interpolymer" means polymers prepared by the polymerization of at least two different types of monomers. The generic term "interpolymer" thus includes the term "copolymers", which is usually employed to refer to polymers prepared from two different monomers, as well as to polymers prepared from more than two different types of monomers.

The subject invention is in a unique polymer composition comprising: (A) a homogeneous linear or substantially linear ethylene/α-olefin interpolymer backbone; and (B) an ethylene homopolymer or an ethylene/α-olefin interpolymer which is appended from the interpolymer backbone and which has a density which is at least 0.004 g/cm$^3$ greater than that of the first interpolymer backbone. Such polymer compositions will resist deformation under high temperatures better than a comparative physical blend or in-reactor blend of the first and second interpolymers. Such improved high temperature performance is reflected in higher under load service temperature (ULST) values, that is, the tendency of the heteromorphic polymer compositions to fail due to softening/melting, as measured using a Rheometrics Solids Analyzer using the procedure set forth below.

Figure 1:
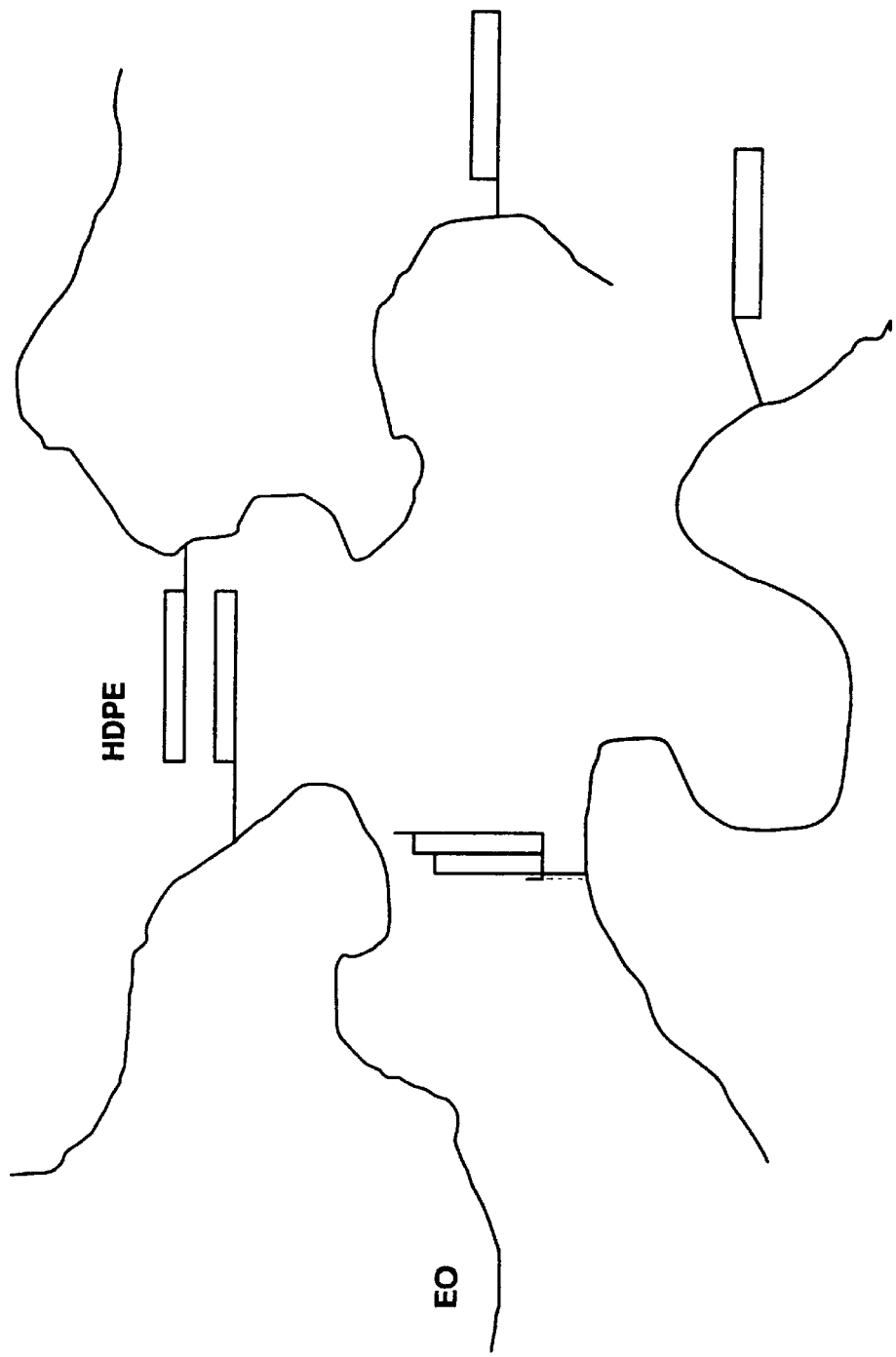
FIG. 1 is an illustration of an elastomer (EO) with grafted hard segments of high density polyethylene (HDPE).

While not wishing to be bound by theory, it is believed that the material science principle used to improve the high temperature performance of homogeneous linear or substantially linear elastomers is illustrated in FIG. 1. As shown in FIG. 1, the elastomer acts as a soft segment to provide flexibility at room temperature of the heteromorphic polymer composition. The grafting of a hard segment, such as high density polyethylene, which has a higher crystalline melting point, improves the ULST, since the hard segments cocrystallize into their own small interspersed domains and serve to tie the elastomer chains into a three dimensional network.

Figure 2A:
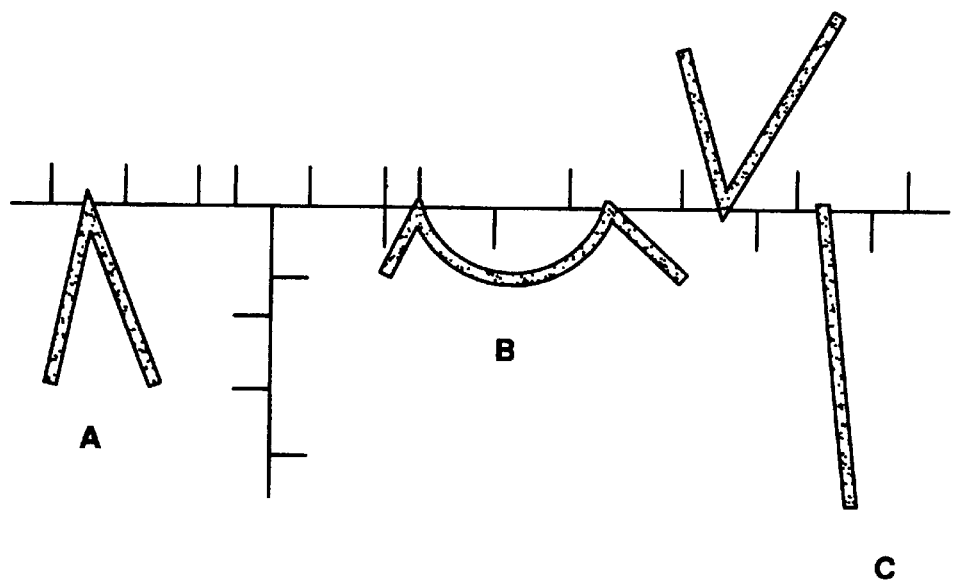
FIGS. 2A–2B illustrate examples of heteromorphic polymer compositions with different connections of the polymer branch.
Figure 2B:
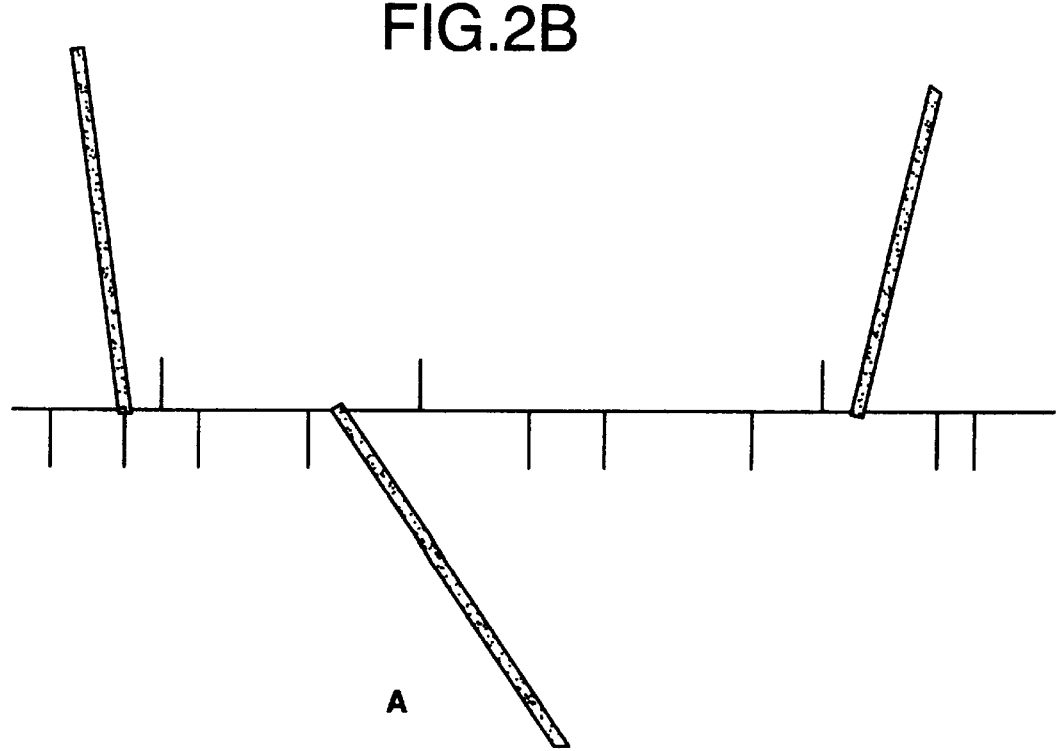

Depending on the composition of the branch polymer and the method of branch incorporation, the branch may have many forms, of which certain exemplary forms are as shown in FIG. 2. FIG. 2-1 shows a substantially linear copolymer backbone with three different forms of connection of the polymer branch. FIG. 2-1(a) illustrates the branch resulting from an "H-link" with the backbone polymer. This could, for example, be introduced by randomly crosslinking the backbone polymer and the precursor polymer to the heteromorphic long chain branch. FIG. 2-1(b) illustrates a long-chain branch linking to the backbone polymer at two (or more) positions. Provided that the long-chain branch can still cocrystallize or form a "hard" phase so that the temperature resistance and/or physical properties of the polymer are improved, this method of long-chain branch incorporation is acceptable and within the scope of our definition of long-chain branch. FIG. 2-1(c) illustrates the formation of a "T" with the backbone polymer. This could, for example, result from grafting a reactive endgroup of a heteromorphic long-chain branch precursor polymer with the backbone polymer, or could result from copolymerization of a reactive endgroup such as vinyl with the monomers during polymerization of the backbone polymer (in this case, of course, the "backbone polymer" is just a concept and is not substantially present in pure form).

FIGS. 2-2 illustrates an example of the variation where a linear copolymer (2-2) backbone polymer has "T" type heteromorphic long-chain branches such as resulting from copolymerization or grafted endgroups.

The ethylene/α-olefin interpolymer (A) which constitutes the backbone of the heteromorphic olefin polymer of the invention will be either a homogeneous linear or substantially linear ethylene/α-olefin interpolymer, both of which are described in greater detail below.

The density of the backbone polymer depends on the type and amount of comonomer used. The density may be controlled according to methods known to those skilled in the art, in order to control the softness of the polymer over the range from highly amorphous, elastomeric grades to highly crystalline, nonelastomeric grades. The choice of backbone polymer density will depend on the requirements of each application according to the performance requirements known to those skilled in the art. Typically, however, the density of the backbone polymer will be less than 0.920 g/cm$^3$, preferably less than 0.900 g/cm$^3$, more preferably less than 0.880 g/cm$^3$. In applications where the best elastomeric properties are required, the density of the backbone polymer will be less than 0.870 g/cm$^3$, preferably less than 0.865 g/cm$^3$, with densities as low as 0.850 g/cm$^3$ being achievable.

The molecular weight of the backbone polymer may likewise vary according to each system. When the branch polymer is attached to the backbone polymer by crosslinking or grafting, it may be preferred to reduce the molecular weight of the backbone interpolymer to reduce gelation, particularly if the branch polymer is high molecular weight or multifunctional in reactive sites. It is an aspect of this invention that excellent physical properties may be obtained even with relatively low molecular weight backbone polymers due to the optimized connectivity afforded by the heteromorphic character of the compositions of the invention. Thus, it is possible to obtain good physical properties and good processability simultaneously.

Typically, however, the backbone polymer will have a melt index ($I_2$) of from 0.01 to 10,000 g/10 min., and preferably from 0.01 to 1,000 g/10 min. Especially preferred melt indices are greater than 10 g/10 min., more preferably greater than 20 g/10 min. Note that for low molecular weight polymers, that is, polymers having a melt index greater than 1000 g/10 min., molecular weight may be indicated rather by measuring the melt viscosity of the polymer at 350° F. The melt viscosities at 350° F. of polymers having melt indices of 1000 g/10 min. and 10,000 g/10 min., as measured by the technique set forth in the Test Procedures section below, are approximately 8200 and 600 centipoise respectively.

The branch polymer (B) which appends from polymer backbone (A) may be any polymer that can be copolymerized with the monomers during production of the backbone polymer, or that may be grafted or crosslinked with the backbone polymer, and that has a density which is at least 0.004 g/cm$^3$, preferably at least 0.006 g/cm$^3$, more preferably at least 0.01 g/cm$^3$ greater than that of the backbone polymer. Preferably, the branch polymer (B), in its pure state, will have a glass transition temperature (Tg) or crystalline melting point (Tm) which is at least 10° C., preferably 20° C., and most preferably at least 50° C. higher than the Tg or Tm (whichever is higher) of the backbone polymer in its pure state. Note that for the purpose of this invention, the term "grafting" means linking one endgroup of the branch polymer to the backbone polymer, while the term "crosslinking" means, in a limited fashion, connecting via one or more linkages elsewhere along the long-chain branch precursor (that is, not an endgroup) to form the heteromorphic long chain branched composition rather than a crosslinked network.

Non-limiting examples of heteromorphic long-chain branch materials include heterogeneously and homogeneously branched linear ethylene homopolymers and ethylene/α-olefin interpolymers, as well as substantially linear ethylene homopolymers and ethylene/α-olefin interpolymers, each of which is described in more detail below. Such branch polymers may further optionally be functionalized.

A suitable branch polymer for one backbone polymer might not be suitable for another backbone polymer. For example, a suitable branch polymer for a homogeneous linear or substantially linear ethylene/octene interpolymer having a density of 0.865 g/cm³ would be an ethylene/octene interpolymer having a density of 0.900 g/cm³. However, the same branch polymer would not be suitable for use in conjunction with a polymer backbone which is a homogeneous linear or substantially linear ethylene/octene interpolymer having a density of 0.920 g/cm³, as the Tm of the former is not at least 10° C. greater than the Tm of the latter (and in fact is significantly lower).

The heteromorphic long-chain branch will further be of sufficient molecular weight to be able to cocrystallize or form a phase with other branch polymer molecules or additionally added polymer. Preferably, the heteromorphic long-chain branch will have a weight average molecular weight ($M_w$) of at least 1000, preferably at least 3000, as measured in accordance with the procedure set forth in the Test Methods section below.

The amount of backbone polymer should be sufficient to make it the continuous or co-continuous phase in the mixture of backbone polymer and heteromorphic long-chain branch polymer. In particular, the ratio by weight of backbone polymer to branch polymer will generally be greater than 1:3, preferably at least 1:2, and most preferably greater than 1:1. Those skilled in the art will recognize that the optimum ratio will vary with application and resultant changes in preferences for elastomer properties, high temperature properties, modulus/stiffness, etc.

The average number of heteromorphic long chain branches per polymer backbone molecule will be sufficient to provide to the final polymer composition an improvement in temperature resistance as measured by RSA and/or an improvement in tensile strength that is greater than that provided by a simple physical blend of comparable polymers without copolymerization, grafting, or crosslinking. Preferably, the compositions of the invention will exhibit a temperature resistance as measured by RSA of at least 10° C., preferably at least 15° C. greater than that of a physical blend of comparable polymers. Preferably, the compositions of the invention will exhibit an ultimate tensile strength which is at least 70 percent that of the physical blend of comparable polymers, more preferably at least 85 percent, most preferably which equals or exceeds that of the physical blend of comparable polymers, with ultimate tensile strengths which are 120 percent of the physical blend of comparable polymers being easily attained.

The average number of heteromorphic long chain branches per polymer backbone molecule, however, will not be so great as to reduce the elastomeric properties of the polymer backbone to an unacceptable level. For instance, when the backbone polymer has a density of less than 0.900 g/cm³, the composition of the invention will preferably exhibit a percent elongation which is at least 40 percent, more preferably which is at least 50 percent, even more preferably which is at least 60 percent that of the blend of comparable polymers, with compositions exhibiting percent elongations which equal or exceed that of the comparable blend being easily achieved.

The ethylene polymers useful as the polymer backbone (A) and the heteromorphic long chain branch (B) can independently be interpolymers of ethylene and at least one α-olefin. Suitable α-olefins are represented by the following formula:

in which R is a hydrocarbyl radical. The comonomers which form a part of backbone polymer (A) may be the same as or different from the comonomers which form the heteromorphic long chain branch (B).

R generally has from one to twenty carbon atoms. Suitable α-olefins for use as comonomers in a solution, gas phase or slurry polymerization process or combinations thereof include the $C_3$–$C_{20}$ α-olefins, styrene, tetrafluoroethylene, vinyl benzocyclobutane, 1,4-hexadiene, 1,7-octadiene, and cycloalkenes, for example cyclopentene, cyclohexene, cyclooctene, norbornene (NB), and ethylidene norbornene (ENB). Preferred $C_3$–$C_{20}$ α-olefins include 1-propylene, 1butene, 1isobutylene, 1-pentene, 1-hexene, 4-methyl- 1-pentene, 1-heptene and 1-octene, as well as other monomer types such as). Preferably, the α-olefin will be 1butene, 1-pentene, 4-methyl- 1-pentene, 1-hexene, 1-heptene, 1-octene, NB or ENB, or mixtures thereof. More preferably, the α-olefin will be 1-hexene, 1-heptene, 1-octene, or mixtures thereof. Most preferably, the α-olefin will be 1-octene.

Ethylene/α-olefin/diene terpolymers may also be used as elastomeric polymers in this invention. Suitable α-olefins include the α-olefins described above as suitable for making ethylene α-olefin copolymers. The dienes suitable as monomers for the preparation of such terpolymers are typically non-conjugated dienes having from 6 to 15 carbon atoms. Representative examples of suitable non-conjugated dienes that may be used to prepare the terpolymer include:
 a) Straight chain acyclic dienes such as 1,4-hexadiene, 1,5-heptadiene, and 1,6-octadiene;
 b) branched chain acyclic dienes such as 5-methyl-1, 4-hexadiene, 3,7-dimethyl-1-6-octadiene, and 3,7-dimethyl-1,7-octadiene, and 1,9-decadiene;
 c) single ring alicyclic dienes such as 4-vinylcyclohexene, 1-allyl-4-isopropylidene cyclohexane, 3-allylcyclopentene, 4-allylcyclohexene, and 1-isopropenyl-4-butenylcyclohexane;
 d) multi-ring alicyclic fused and bridged ring dienes such as dicyclopentadiene; alkenyl, alkylidene, cycloalkenyl and cycloalkylidene norbornenes such as 5-methylene-2-norbornene, 5-methylene-6-methyl-2-norbornene, 5-methylene-6, 6-dimethyl-2-norbornene, 5-propenyl-2-norbornene, 5-(3-cyclopentenyl)-2-norbornene, 5-ethylidene-2-norbornene, 5-cyclohexylidene-2-norbornene, etc.

The preferred dienes are selected from the group consisting of 1,4-hexadiene, dicyclopentadiene, 5-ethylidene-2-norbornene, 5-methylene-2-norbornene, 7-methyl-1, 6-octadiene, 4-vinylcyclohexene, etc. A suitable conjugated diene is piperylene.

The preferred terpolymers for the practice of the invention are terpolymers of ethylene, propylene and a non-conjugated diene (EPDM). Such terpolymers are commercially available.

The homogeneous polyethylenes that can be used as components (A) and (B) of this invention fall into two broad categories, the linear homogeneous polyethylenes and the substantially linear homogeneous polyethylenes. Both are known.

"Homogeneous" polymers are ethylene interpolymers in which any comonomer is randomly distributed within a given interpolymer molecule and substantially all of the interpolymer molecules have the same ethylene/comonomer ratio within that interpolymer. Homogeneous polymers generally are characterized as having a single melting peak between −30° C. and 150° C., as determined by differential scanning calorimetry (DSC). The single melting peak is determined using a differential scanning calorimeter standardized with indium and deionized water. The method involves 3–7 mg sample sizes, a "first heat" to about 180° C. which is held for 4 minutes, a cool down at 10° C./min. to −30° C. which is held for 3 minutes, and heat up at 10° C./min. to 140° C. for the "second heat". The single melting peak is taken from the "second heat" heat flow versus temperature curve. Total heat of fusion of the polymer is calculated from the area under the curve.

For polymers having a density of 0.875 g/cm$^3$ to 0.910 g/cm$^3$, the single melting peak may show, depending on equipment sensitivity, a "shoulder or a "hump" on the low melting side that constitutes less than 12 percent, typically, less than 9 percent, and more typically less than 6 percent of the total heat of fusion of the polymer. Such an artifact is also observable for homogeneous linear polymers such as Exact™ resins (available from Exxon Chemical Company), and is discerned on the basis of the slope of the single melting peak varying monotonically through the melting region of the artifact. Such an artifact occurs within 34° C., typically within 27° C., and more typically within 20° C. of the melting point of the single melting peak. The heat of fusion attributable to an artifact can be separately determined by specific integration of its associated area under the heat flow versus temperature curve.

In addition or in the alternative, the homogeneity of the polymers is typically described by the CDBI (Composition Distribution Branch Index) and is defined as the weight percent of the polymer molecules having a comonomer content within 50 percent of the median total molar comonomer content. The CDBI of a polymer is readily calculated from data obtained from techniques known in the art, such as, for example, temperature rising elution fractionation (abbreviated herein as "TREF") as described, for example, in Wild et al, Journal of Polymer Science, Poly. Phys. Ed., Vol. 20, p. 441 (1982), in U.S. Pat. No. 4,798,081 (Hazlitt et al.), or in U.S. Pat. No. 5,089,321 (Chum et al.), each of which is incorporated herein by reference. The CDBI for the homogeneous linear and for the substantially linear ethylene/α-olefin polymers used in the present invention is preferably greater than 50 percent, more preferably greater than 70 percent.

Homogeneous polymers will also typically have a molecular weight distribution, $M_w/M_n$, less than or equal to 3 (when the density of the interpolymer is less than about 0.960 g/cm$^3$), preferably less than or equal to 2.5. The molecular weight determination is deduced by using narrow molecular weight distribution polystyrene standards (from Polymer Laboratories) in conjunction with their elution volumes. The SLEPs are analyzed by gel permeation chromatography (GPC) on a Waters 150 C high temperature chromatographic unit equipped with differential refractometer and three columns of mixed porosity. The columns are supplied by Polymer Laboratories and are commonly packed with pore sizes of 10$^3$, 10$^4$, 10$^5$ and 10$^6$. The solvent is 1,2,4-trichlorobenzene, from which 0.3 percent by weight solutions of the samples are prepared for injection. The flow rate is 1.0 ml/min, unit operating temperature is 140 C, and the injection size is 100 microliters.

The equivalent polyethylene molecular weights are determined by using appropriate Mark-Houwink coefficients for polyethylene and polystyrene (as described by Williams and Ward in *Journal of Polymer Science*, Polymer Letters, Vol. 6, p.621, 1968), incorporated herein by reference to derive the equation $M_{polyethylene} = a \cdot (M_{polystyrene})^b$. In this equation, a=0.4316 and b=1.0. Weight average molecular weight, $M_w$, is calculated in the usual manner according to the formula $$M_w = \Sigma(w_i \times M_i)$$

where $w_i$ and $M_i$ are the weight fraction and molecular weight, respectively, of the $i^{th}$ fraction eluting from the GPC column.

Homogeneous linear ethylene polymers have long been commercially available. As exemplified in U.S. Pat. No. 3,645,992 to Elston, incorporated herein by reference, homogeneous linear ethylene polymers can be prepared in conventional polymerization processes using Ziegler-type catalysts such as, for example, zirconium and vanadium catalyst systems. U.S. Pat. No. 4,937,299 to Ewen et al. and U.S. Pat. No. 5,218,071 to Tsutsui et al., each of which is incorporated herein by reference, disclose the use of metallocene catalysts, such as catalyst systems based on zirconium and hafnium, for the preparation of homogeneous linear ethylene polymers. Homogeneous linear ethylene polymers are typically characterized as having a molecular weight distribution, $M_w/M_n$, of about 2. Commercially available examples of homogeneous linear ethylene polymers include those sold by Mitsui Petrochemical Industries as Tafmer™ resins and by Exxon Chemical Company as Exact™ resins.

Substantially linear ethylene polymers (SLEPs) are homogeneous polymers having long chain branching. They are disclosed in U.S. Pat. Nos. 5,272,236 and 5,278,272 each of which is incorporated herein by reference. SLEPs are made by the Insite™ Process and Catalyst Technology, and are available from The Dow Chemical Company as Affinity™ polyolefin plastomers (POPs) and from DuPont Dow Elastomers, LLC as Engage™ polyolefin elastomers (POEs). SLEPs can be prepared via the solution, slurry, or gas phase, preferably solution phase, polymerization of ethylene and one or more optional α-olefin comonomers in the presence of a constrained geometry catalyst, such as is disclosed in European Patent Application 416,815-A incorporated herein by reference.

The term "substantially linear" means that, in addition to the short chain branches attributable to homogeneous comonomer incorporation, the ethylene polymer is further characterized as having long chain branches, such that the polymer backbone is substituted with an average of 0.01 to 3 long chain branches/1000 carbons. Preferred substantially linear polymers for use in the invention are substituted with from 0.01 long chain branch/1000 carbons to 1 long chain branch/1000 carbons, and more preferably from 0.05 long chain branch/1000 carbons to 1 long chain branch/1000 carbons.

"Long chain branching" (LCB) means a chain length of at least 6 carbons, above which the length cannot be distinguished using $^{13}C$ nuclear magnetic resonance spectroscopy. Each long chain branch has the same comonomer distribution as the polymer backbone and can be as long as the polymer backbone to which it is attached.

The presence of long chain branching can be determined in ethylene polymers by using $^{13}C$ nuclear magnetic resonance (NMR) spectroscopy and is quantified using the method described by Randall (Rev. Macromol. Chem. Phys., C.29, V. 2&3, p. 285–297), incorporated herein by reference.

As a practical matter, current $^{13}$C nuclear magnetic resonance spectroscopy cannot determine the length of a long chain branch in excess of six carbon atoms. However, there are other known techniques useful for determining the presence of long chain branches in ethylene polymers, including ethylene/1-octene interpolymers. Two such methods are gel permeation chromatography coupled with a low angle laser light scattering detector (GPC-LALLS) and gel permeation chromatography coupled with a differential viscometer detector (GPC-DV). The use of these techniques for long chain branch detection and the underlying theories have been well documented in the literature. See, for example, Zimm, G.H. and Stockmayer, W. H., J.Chem. Phys., 17,1301 (1949) and Rudin, A., *Modern Methods of Polymer Characterization*, John Wiley & Sons, New York (1991) pp. 103–112, both of which are incorporated by reference.

A. Willem deGroot and P. Steve Chum, both of The Dow Chemical Company, at the Oct. 4, 1994 conference of the Federation of Analytical Chemistry and Spectroscopy Society (FACSS) in St. Louis, Mo., presented data demonstrating that GPC-DV is a useful technique for quantifying the presence of long chain branches in SLEPs. In particular, deGroot and Chum found that the level of long chain branches in homogeneous SLEP samples measured using the Zimm-Stockmayer equation correlated well with the level of long chain branches measured using $^{13}$C NMR.

Further, deGroot and Chum found that the presence of octene does not change the hydrodynamic volume of the polyethylene samples in solution and, as such, one can account for the molecular weight increase attributable to octene short chain branches by knowing the mole percent octene in the sample. By deconvoluting the contribution to molecular weight increase attributable to 1-octene short chain branches, deGroot and Chum showed that GPC-DV may be used to quantify the level of long chain branches in substantially linear ethylene/octene copolymers.

deGroot and Chum also showed that a plot of Log ($I_2$, Melt Index) as a function of Log(GPC Weight Average Molecular Weight) as determined by GPC-DV illustrates that the long chain branching aspects (but not the extent of long branching) of SLEPs are comparable to that of high pressure, highly branched low density polyethylene (LDPE) and are clearly distinct from ethylene polymers produced using Ziegler-type catalysts such as titanium complexes and ordinary catalysts for making homogeneous polymers such as hafnium and vanadium complexes.

For ethylene/α-olefin interpolymers, the long chain branch is longer than the short chain branch that results from the incorporation of the α-olefin(s) into the polymer backbone. The empirical effect of the presence of long chain branching in the substantial linear ethylene/α-olefin interpolymers used in the invention is manifested as enhanced rheological properties which are quantified and expressed herein in terms of gas extrusion rheometry (GER) results and/or melt flow, $I_{10}/I_2$, increases.

In contrast to the term "substantially linear", the term "linear" means that the polymer lacks measurable or demonstrable long chain branches, that is, the polymer is substituted with an average of less than 0.01 long chain branch/ 1000 carbons.

SLEPs are further characterized as having:

(a) a melt flow ratio, $I_{10}/I_2 \geq 5.63$, (b) a molecular weight distribution, $M_w/M_n$ as determined by gel permeation chromatography and defined by the equation:

$$(M_w/M_n) \leq (I_{10}/I_2) - 4.63,$$

(c) a gas extrusion rheology such that the critical shear rate at onset of surface melt fracture for the SLEP is at least 50 percent greater than the critical shear rate at the onset of surface melt fracture for a linear ethylene polymer, wherein the SLEP and the linear ethylene polymer comprise the same comonomer or comonomers, the linear ethylene polymer has an $I_2$, $M_w/M_n$ and density within ten percent of the SLEP and wherein the respective critical shear rates of the SLEP and the linear ethylene polymer are measured at the same melt temperature using a gas extrusion rheometer, and (d) a single differential scanning calorimetry, DSC, melting peak between −30 and 150 C.

Determination of the critical shear rate and critical shear stress in regards to melt fracture as well as other rheology properties such as rheological processing index (PI), is performed using a gas extrusion rheometer (GER). The gas extrusion rheometer is described by M. Shida, R. N. Shroff and L. V. Cancio in *Polymer Engineering Science*, Vol. 17, No. 11, page 770 (1977), and in "Rheometers for Molten Plastics" by John Dealy, published by Van Nostrand Reinhold Co. (1982) on pages 97–99, each of which is incorporated herein by reference. GER experiments are performed at a temperature of 190 C, at nitrogen pressures between 250 to 5500 psig (1.7 to 38 MPa) using a 0.0754 mm diameter, 20:1 length to diameter die with an entrance angle of 180°. For the substantially linear ethylene polymers described herein, the PI is the apparent viscosity (in kpoise) of a material measured by GER at an apparent shear stress of $2.15 \times 10^6$ dyne/cm$^2$ (0.215 MPa). The substantially linear ethylene polymers for use in the invention includes ethylene interpolymers and have a PI in the range of 0.01 kpoise to 50 kpoise (0.01 to 50 kg/cm·sec), preferably 15 kpoise (15 kg/cm·sec) or less. The substantially linear ethylene polymers used herein have a PI less than or equal to 70 percent of the PI of a linear ethylene polymer (either a Ziegler polymerized polymer or a linear uniformly branched polymer as described by Elston in U.S. Pat. No. 3,645,992) having an $I_2$, $M_w/M_n$ and density, each within ten percent of the substantially linear ethylene polymers.

The rheological behavior of substantially linear ethylene polymers can also be characterized by the Dow Rheology Index (DRI), which expresses a polymer's normalized relaxation time as the result of long chain branching." (See, S. Lai and G. W. Knight ANTEC '93 Proceedings, INSITE™ Technology Polyolefins (SLEP)—New Rules in the Structure/Rheology Relationship of Ethylene α-Oefin Copolymers, New Orleans, La., May 1993) incorporated herein by reference. DRI values range from 0 for polymers which do not have any measurable long chain branching (such as, Tafmer™ products available from Mitsui Petrochemical Industries and Exact™ products available from Exxon Chemical Company) to about 15 and are independent of melt index. In general, for low to medium pressure ethylene polymers (particularly at lower densities) DRI provides improved correlations to melt elasticity and high shear flowability relative to correlations of the same attempted with melt flow ratios. For the substantially linear ethylene polymers useful in this invention, DRI is preferably at least 0.1, and especially at least 0.5, and most especially at least 0.8. DRI can be calculated from the equation:

$$DRI = (3652879 * \tau_o^{1.00649}/\eta_o - 1)/10$$

where $\eta_o$ is the characteristic relaxation time of the material and $\eta_o$ is the zero shear viscosity of the material. Both $\tau_o$ and $\eta_o$ are the "best fit" values to the Cross equation, as follows, $\eta/\eta_o = 1/(1 + (\gamma^* \tau_o)^{1-n})$ in which n is the power law index of the material, and η and γ are the measured viscosity and shear rate, respectively. Baseline determination of viscosity and shear rate data are obtained using a Rheometric Mechanical Spectrometer (RMS-800) under dynamic sweep mode from 0.1 to 100 radians/second at 160 C and a Gas Extrusion Rheometer (GER) at extrusion pressures from 1,000 psi to 5,000 psi (6.89 to 34.5 MPa), which corresponds to shear stress from 0.086 to 0.43 MPa, using a 0.0754 mm diameter, 20:1 length to diameter die at 190 C. Specific material determinations can be performed from 140 to 190 C as required to accommodate melt index variations.

An apparent shear stress versus apparent shear rate plot is used to identify the melt fracture phenomena and quantify the critical shear rate and critical shear stress of ethylene polymers. According to Ramamurthy in the Journal of Rheology, 30(2), 337–357, 1986, incorporated herein by reference, above a certain critical flow rate, the observed extrudate irregularities may be broadly classified into two main types: surface melt fracture and gross melt fracture.

Surface melt fracture occurs under apparently steady flow conditions and ranges in detail from loss of specular film gloss to the more severe form of "sharkskin." Herein, as determined using the above-described GER, the onset of surface melt fracture (OSMF) is characterized at the beginning of losing extrudate gloss at which the surface roughness of the extrudate can only be detected by 40 times magnification. The critical shear rate at the onset of surface melt fracture for the substantially linear ethylene polymers is at least 50 percent greater than the critical shear rate at the onset of surface melt fracture of a linear ethylene polymer having essentially the same $I_2$ and $M_w/M_n$.

Gross melt fracture occurs at unsteady extrusion flow conditions and ranges in detail from regular (for instance, alternating rough and smooth or helical) to random distortions. For commercial acceptability to maximize the performance properties of films, coatings and moldings, surface defects should be minimal, if not absent. The critical shear stress at the onset of gross melt fracture for the substantially linear ethylene polymers, especially those having a density greater than 0.910 g/cm$^3$, used in the invention is greater than 4×10$^6$ dynes/cm$^2$ (0.4 MPa).

Substantially linear ethylene polymers are known to have excellent processability, despite having a relatively narrow molecular weight distribution (that is, the $M_w/M_n$ ratio is typically less than 2.5). Moreover, unlike homogeneously and heterogeneously branched linear ethylene polymers, the melt flow ratio ($I_{10}/I_2$) of substantially linear ethylene polymers can be varied independently of the molecular weight distribution, $M_w/M_n$. Accordingly, the polymer backbone (A) of the heteromorphic polymer compositions of the invention is preferably a substantially linear ethylene polymer.

The heterogeneous polyethylenes that can be used as the heteromorphic long chain branch (B) in the practice of this invention fall into two broad categories, those prepared with a free radical initiator at high temperature and high pressure, and those prepared with a coordination catalyst at high temperature and relatively low pressure. The former are known generally as low density polyethylenes (LDPE) and are characterized by branched chains of polymerized monomer units pendant from the polymer backbone. LDPE polymers generally have a density between 0.910 and 0.935 g/cm$^3$. Ethylene polymers and copolymers prepared by the use of a coordination catalyst, such as a Ziegler or Phillips catalyst, are generally known as linear polymers because of the substantial absence of branch chains of polymerized monomer units pendant from the backbone. High density polyethylene (HDPE), generally having a density of about 0.941 to about 0.965 g/cm$^3$, is typically a homopolymer of ethylene or a copolymer of ethylene and low levels of a comonomer, and it contains relatively few branch chains relative to the various linear copolymers of ethylene and an α-olefin. HDPE is well known, commercially available in various grades, and may be used in this invention.

Linear copolymers of ethylene and at least one α-olefin of 3 to 12 carbon atoms, preferably of 4 to 8 carbon atoms, are also well known and commercially available. As is well known in the art, the density of a linear ethylene/α-olefin copolymer is a function of both the length of the α-olefin and the amount of such monomer in the copolymer relative to the amount of ethylene, the greater the length of the α-olefin and the greater the amount of α-olefin present, the lower the density of the copolymer. The densities of these linear polymers generally range from 0.87 to 0.91 g/cm$^3$.

Both the materials made by the free radical catalysts and by the coordination catalysts are well known in the art, as are their methods of preparation. Heterogeneous linear ethylene polymers are available from The Dow Chemical Company as Dowlex™ m LLDPE and as Attane™ ULDPE resins. Heterogeneous linear ethylene polymers can be prepared via the solution, slurry or gas phase polymerization of ethylene and one or more optional α-olefin comonomers in the presence of a Ziegler-Natta catalyst, by processes such as are disclosed in U.S. Pat. No. 4,076,698 to Anderson et al. incorporated herein by reference. Heterogeneous ethylene polymers are typically characterized as having molecular weight distributions, $M_w/M_n$, in the range of from 3.5 to 4.1. Relevant discussions of both of these classes of materials, and their methods of preparation are found in U.S. Pat. No. 4,950,541, incorporated herein by reference, and the patents to which it refers.

Heterogenous polymers are ethylene/α-olefin interpolymers characterized as having a linear backbone and a differential scanning calorimetry (DSC) melting curve having a distinct melting peak greater than 115° C. attributable to a high density fraction. Heterogeneous interpolymers will typically have an $M_w/M_n$ greater than 3 (when the density of the interpolymer is less than 0.960 g/cm$^3$), and will typically have a CDBI less than or equal to 50, indicating that such interpolymers are a mixture of molecules having differing comonomer contents and differing amounts of short chain branching.

The crystallinity in reference to an ethylene polymer is a well known property of ethylene polymers. Various techniques have been developed to measure ethylene polymer crystallinity.

When the ethylene polymer is derived exclusively from hydrocarbon monomers (that is, when the ethylene polymer is a non-functionalized ethylene α-olefin interpolymer), the crystallinity can be determined from the density of the polymer using the following equation:

percent C=(ρ−ρa)/ρ(ρc−ρa)×100 in which percent C is the percent crystallinity of the ethylene polymer, ρa is the density of an ethylene polymer which has 0 percent crystallinity (that is, which is 100 percent amorphous) at room temperature (0.852 g/cm$^3$.), ρc represents the density of an ethylene polymer at 100 percent crystallinity at room temperature (1.000 g/cm$^3$.) and ρ represents the density of the polymer for which the percent crystallinity is being determined. Density may be determined according to ASTM D792 in which the samples are annealed at ambient temperature for 24 hours before the measurement is taken.

The term "under load service temperature" (ULST), also referred to as "softening point under load" or "SPUL", means the temperature at which probe penetration of 1 mm into the polymer is achieved using a device capable of applying a constant force of 1 N to a flat tip probe having a diameter of 1 mm while raising the temperature of the polymer from 25 C at a rate of 5 C/minute under a nitrogen atmosphere. One such device is a ThermoMechanical Analyzer (TMA) such as Model TMA-7 made by the Perkin-Elmer Instrument Company. The procedure for conducting this test is described in more detail in the Examples section below.

The higher density branch-forming polymer (B) can be of a broad range of molecular weights. On the low molecular weight side, the branch polymer will have an Mn of at least 2000, preferably at least 3000. On the higher molecular weight side, the branch polymer will have an $I_2$ of at least 0.05 g/cm$^3$. Typical melt indices for the branch polymer range from 0.05 to 40 g/10 min.

When it is desirable to utilize a higher molecular weight branch polymer, that is, a branch polymer having an $I_2$ of less than 5 g/10 min., the decreased number of branch polymer chains will require the presence of a higher concentration of the branch polymer, that is, amounts greater than 20 weight percent (or the use of higher levels of free radical initiator, that is, amounts greater than 0.5 weight percent) to yield a given increase in under load service temperature. In contrast, when a lower molecular weight branch polymer is used, the presence of an increased number of shorter chains (which are preferably vinyl terminated) will cause an increase in under load service temperature, despite the use of relatively small amounts of the branch polymer, that is, amounts as low as 5 weight percent.

While not wishing to be bound by theory, it is believed that in the case of lower molecular weight branch polymers, low concentrations of the same may be employed, as the heteromorphic polymer compositions will tend to have more than one small branch chain appending from each polymer backbone. As shown in FIG. 1, it is believed that the presence of more than one branch per backbone molecule will tend to lock polymer backbone molecules together, which will provide structural integrity to the system despite the melting of the lower crystallinity polymer backbone material at higher use temperatures.

Many methods for producing the heteromorphic compositions of the invention can be envisioned by those skilled in the art of polymer science.

In one embodiment, the higher crystallinity branch polymer and the lower crystallinity backbone polymer will be prepared by reacting previously prepared and isolated polymer reactants. In this case, the higher crystallinity branch polymer will react to form a T-link (by grafting) or an H-link (by light crosslinking) with the lower crystallinity backbone polymer. This reaction may be accomplished by methods of known to those skilled in the art.

In one embodiment, hydrogen will be abstracted from the polymer backbone, and will react with the branch polymer. Methods for abstracting hydrogen from the polymer backbone include but are not limited to reaction with free radicals which are generated by homolytically cleaving molecules (for instance, peroxide-containing compounds, or azo-containing compounds) or by radiation.

The presence of olefinic unsaturation on the backbone polymer or branch polymer can help control the location of the grafting/crosslinking sites. For example, peroxide decomposition in the presence of a major fraction of a saturated backbone polymer and a minor fraction of vinyl-terminated branch polymer will tend to graft the branch polymer onto the backbone polymer, whereas a vinyl-free branch polymer can undergo hydrogen abstraction to produce a radical which will react with that of the backbone polymer to form H-links. Vinyl-terminated branch polymers are prepared by adjusting reactor conditions such that the polymerizing chains are terminated by beta-hydride elimination, rather than being hydrogen terminated. In addition, coagents such as mono-, di- or tri-allyl functional molecules (for instance, triallyl cyanurate) may be used to further control the free radical processes. In general, grafting is preferred over light crosslinking, since more heteromorphic long-chain branches may be incorporated without gelation.

Use of $\alpha,\Omega$-dienes as a comonomer in the formation of the higher branch-forming polymer or in the backbone-forming polymer will increase the reactivity of that polymer component. Suitable $\alpha,\Omega$-dienes include 1,7-octadiene and 1,9 decadiene. When incorporated, such dienes will typically be present in an amount less than 2 per polymer chain.

The crosslinking or grafting reactions may be carried out in a solution of the two polymers in an appropriate solvent or in a melt blend of the polymer components. The latter is the preferred method. Melt blending can be done in a batch mixer such as a Brabender mixer, Banbury mixer, roll mill, or in a continuous mixer such as a Farrell Continuous Mixer, or in a single or twin screw extruder. It is also possible to form a mixture of the polymers, then irradiate or imbibe with reactive solution (such as peroxide) and heat. However, melt or solution blending is preferred over these approaches.

In an alternate embodiment, the compositions of the invention may be prepared by copolymerizing the branch polymer with monomers that make the backbone polymer. With a dual catalyst system, it is envisioned that the backbone polymer and the subject composition (that is, the heteromorphic polymer composition) could be copolymerized simultaneously. This method has the advantage of minimizing phase-out of high Tg/Tm polymer in a relatively cold reactor.

In an alternate embodiment, the compositions of the invention may be produced in a series dual reactor arrangement whereby the branch polymer is made in the first reactor and then fed into a second reactor where it is copolymerized with the monomers which form the backbone polymer to make the subject composition. The second reactor should be maintained at a temperature which is greater than that at which the higher crystallinity branch polymer would phase separate from the lower crystallinity backbone polymer. It is preferred that the reactor in which the copolymerization takes place be a reactor with a high polymer ("solids") concentration, such as a loop reactor, to maximize the concentration of polymerizable higher crystallinity branch polymer in the reactor.

In one embodiment, a single site catalyst will be employed to copolymerize higher crystallinity branch polymers with ethylene and octene to produce ethylene/octene elastomers having HDPE side-chain branches. Single site catalysts, particularly constrained geometry catalysts, are advantageous, in that they have a higher acceptance of high molecular weight monomers than traditional Ziegler catalysts or non-constrained geometry single site catalysts. Unlike crosslinking, copolymerization avoids gelation even at relatively high heteromorphic long-chain branch contents, since only one site on the long chain branch is reactive.

It is preferred that the high Tm or Tg heteromorphic long chain branch precursor monomer be of relatively low molecular weight and have at least one olefin endgroup per chain to aid in the copolymerization and the dissolution of the monomer in the process solvent and/or diffusion to the catalyst site.

Optionally, a diene or polyene may be used as a comonomer in one or both polymers to improve the rate of incorporation/linkage during the copolymerization. For example, an ethylene-diene or propylene-diene copolymer could be produced in one reactor, then fed to a second reactor where it is copolymerized with ethylene and octene or ethylene and propylene. Provided that the level of diene is relatively low, gelation may be avoided while increasing the rate of copolymerization of heteromorphic branch precursor polymer and the monomers of the backbone polymer. Preferably, when a diene or polyene is utilized as a comonomer, it will be constitute less than 20 weight percent, more preferably less than 10 weight percent of the composition of the invention.

In an alternate embodiment, the heteromorphic polymer composition may be blended with one or more additional polymers that are of similar structure to the branch polymer or that can form a high Tm or Tg phase with it via solid solution or cocrystallization. One example of such a blend component is high density polyethylene. When the concentration of branch polymer is low in the heteromorphic polymer composition, it may be necessary to provide additional polymer for the branches to cocrystallize or solidify in a phase with in order to obtain the desired physical property and/or temperature resistance properties. An excess of the higher crystallinity polymer will usefully cocrystallize with the higher crystallinity branches of the heteromorphic polymer compositions, serving to increase the thickness of the lamella, which will tend to increase the crystalline melting temperature of the polymer composition. Further, such an excess of the higher crystallinity polymer will serve to bridge two separate higher crystallinity branches, which will raise the overall crystallinity of the heteromorphic polymer composition, which will increase the under load service temperature. A preferred way to introduce the additional polymer is to simply add an excess of the branch polymer to the reactor or melt blender so that as the copolymerization or grafting or crosslinking takes place, excess unreacted branch polymer remains unreacted and is available for cocrystallization or phase formation with the heteromorphic long-chain branches.

In a further embodiment, the compositions of the invention may be used in blends with other polymers. For instance, the compositions of the invention may be blended with other polyolefins, such as heterogeneously branched linear ethylene/α-olefin interpolymers, homogeneously branched linear ethylene/α-olefin interpolymers, substantially linear ethylene/α-olefin interpolymers, ethylene/vinyl acetate copolymers, styrene block copolymers, and amorphous polyolefins (such as polypropylene and polybutene).

In one preferred embodiment, the heteromorphic polymer composition will include at least one component which contains polar moieties. That is, either the backbone polymer or the branch polymer will preferably be functionalized by grafting of a polar moiety thereto.

Any unsaturated organic compound containing at least one site of ethylenic unsaturation (for example, at least one double bond), at least one carboxyl group (—COOH), and that will graft to an ethylene polymer as described above can be used in the practice of this invention. As here used, "carboxyl group" includes carboxyl groups per se and derivatives of carboxyl groups such as anhydrides, esters and salts (both metallic and nonmetallic). Preferably, the organic compound contains a site of ethylenic unsaturation conjugated with a carboxyl group. Representative compounds include maleic, acrylic, methacrylic, itaconic, crotonic, α-methyl crotonic, and cinnamic acid and their anhydride, ester and salt derivatives, and fumaric acid and its ester and salt derivatives. Maleic anhydride is the preferred unsaturated organic compound containing at least one ethylenic unsaturation and at least one carboxyl group.

The unsaturated organic compound content of the grafted backbone polymer or branch polymer is preferably at least 0.01 wt percent, and more preferably at least 0.05 wt percent, based on the combined weight of the polymer and the organic compound. The maximum amount of unsaturated organic compound content can vary to convenience, but typically it does not exceed 10 wt percent, preferably it does not exceed 5 wt percent, and more preferably it does not exceed 2 wt percent of the grafted polymer.

The unsaturated organic compound can be grafted to the desired or branch polymer by any known technique, such as those taught in U.S. Pat. No. 3,236,917 and U.S. Pat. No. 5,194,509 each of which is incorporated herein by reference. For example, in the '917 patent the polymer is introduced into a two-roll mixer and mixed at a temperature of 60 C. The unsaturated organic compound is then added along with a free radical initiator, such as, for example, benzoyl peroxide, and the components are mixed at 30 C until the grafting is completed. In the '509 patent, the procedure is similar except that the reaction temperature is higher, for example, 210 to 300 C, and a free radical initiator is not used or is used at a reduced concentration.

An alternative and preferred method of grafting is taught in U.S. Pat. No. 4,950,541, incorporated herein by reference, by using a twin-screw devolatilizing extruder as the mixing apparatus. The ethylene polymer and unsaturated organic compound are mixed and reacted within the extruder at temperatures at which the reactants are molten and in the presence of a free radical initiator. Preferably, the unsaturated organic compound is injected into a zone maintained under pressure within the extruder.

Grafting of substantially linear ethylene polymers with, for example, maleic anhydride, is disclosed in U.S. Pat. No. 5,346,963, incorporated herein by reference.

In the preparation of the heteromorphic polymer compositions, it is recognized that the presence of the free radical initiator may lead to limited crosslinking of adjacent backbone polymers, either directly to one another or via the appending branch. Provided that the level of such linkages is not sufficient to render the polymer composition unprocessable in thermoplastic fabrication or extrusion processes, it is within the scope of this invention. Preferably, the hetermorphic polymer compositions will have less than 30 percent gel, more preferably less than 10 percent gel, more preferably less than 5 percent gel, and most preferably less than 2 percent gel. Most preferably, the heteromorphic polymer compositions will be substantially free of gels.

The heteromorphic polymers of the invention may optionally include antioxidants, fillers, extender oils, ultraviolet light stabilizers, slip and antiblocking agents, pigments, dyes, or blowing agents, according to the practices of those skilled in the art of polymer formulation. When employed, the antioxidant is typically present in an amount less than 0.5 weight percent, preferably less than 0.2 weight percent, based on the total weight of the composition.

The compositions of the invention may usefully be employed in hot melt adhesive and pressure sensitive adhesive formulations. In this regard, the compositions of the invention may be admixed with suitable amounts of one or more tackifiers, one or more waxes, and/or one or more plasticizers.

As used herein, the term "tackifier" means any of several hydrocarbon based compositions useful to impart tack to the hot melt adhesive composition. For instance, several classes of tackifiers include aliphatic $C_5$ resins, polyterpene resins, hydrogenated resins, mixed aliphatic-aromatic resins, rosin esters, and hydrogenated rosin esters. The tackifier employed will typically have a viscosity at 350° F. (177° C.), as measured using a Brookfield viscometer, of no more than 300 centipoise (300 g/cm·sec), preferably no more than 150 centipoise (150 g/cm·sec), and most preferably of no more than 50 centipoise (50 g/cm·sec). The tackifier employed will typically have a glass transition temperature greater than 50° C.

Exemplary aliphatic resins include those available under the trade designations Escorez™, Piccotac™, Mercures™, Wingtack™, Hi-Rez™, Quintone™, Tackirol™, etc. Exemplary polyterpene resins include those available under the trade designations Nirez™, Piccolyte™, Wingtack™, Zonarez™, etc. Exemplary hydrogenated resins include those available under the trade designations Escorez™, Arkon™, Clearon™, etc. Exemplary mixed aliphatic-aromatic resins include those available under the trade designations Escorez™, Regalite™, Hercures™, AR™, Imprez™, Norsolene™M, Marukarez™, Arkon™M, Quintone™, etc. Other tackifiers may be employed, provided they are compatible with the homogeneous linear or substantially linear ethylene/α-olefin interpolymer and the optional wax.

The tackifier will typically be present in the hot melt adhesives of the invention in an amount less than 70 weight percent, preferably less than 50 weight percent. The tackifier will be typically present in the hot melt adhesives of the invention in an amount of at least 5 weight percent, preferably at least 10 weight percent.

The term "wax" is used to refer to paraffinic or crystalline ethylene homopolymer or interpolymer or homogeneous ethylene polymers, which have a number average molecular weight less than 6000. Exemplary polymers falling within this category include ethylene homopolymers available from Petrolite, Inc. (Tulsa, Okla.) as Polywax™ 500, Polywax™ 1500 and Polywax™ 2000; and paraffinic waxes available from CP Hall under the product designations 1230, 1236, 1240, 1245, 1246, 1255, 1260, and 1262.

Polywax™ 2000 has a molecular weight of approximately 2000, an $M_w/M_n$ of approximately 1.0, a density at 16° C. of about 0.97 g/cm³, and a melting point of approximately 126° C.

CP Hall 1246 paraffinic wax is available from CP Hall (Stow, Ohio). CP Hall 1246 paraffinic wax has a melting point of 143° F. (62° C.), a viscosity at 210° F. (99° C.) of 4.2 centipoise (4.2 g/cm·sec), and a specific gravity at 73° F. (23° C.) of 0.915.

Preferred waxes will be prepared using a constrained geometry catalyst. Such polymers will be either ethylene homopolymers or iinterpolymers of ethylene and a comonomer such as is set forth above with respect to polymer one, for instance, $C_3$–$C_{20}$ α-olefins, styrene, alkyl-substituted styrene, tetrafluoroethylene, vinylbenzocyclobutane, non-conjugated dienes, and naphthenics. Such polymers, in contrast to traditional waxes, will have an $M_w/M_n$ of from 1.5 to 2.5, preferably from 1.8 to 2.2. Such polymers are disclosed and claimed in U.S. patent application Ser. No. 784,683, filed on Jan. 22, 1997 (WO 97/01181) incorporated herein by reference.

The wax will have a number average molecular weight less than 6000, preferably less than 5000. Such waxes will typically have a number average molecular weight of at least 800, preferably at least 1300.

The wax useful in the hot melt adhesives of the invention, when it is an ethylene homopolymer (either a traditional ethylene homopolymer wax or an ethylene homopolymer prepared with a constrained geometry catalyst) or an interpolymer of ethylene and a comonomer selected from the group consisting of $C_3$–$C_{20}$ α-olefins, non-conjugated dienes, and naphthenics, will have a density of at least 0.910 g/cm³. Such second polymers will have a density of no more than 0.970 g/cm³, preferably no more than 0.965 g/cm³.

The heteromorphic polymer compositions of the invention are usefully employed in pressure sensitive adhesive formulations, in that the higher crystallinity branch polymer serves to improve the close time of the adhesive. As the adhesive cools, the branch polymer crystallizes while the polymer backbone remains soft and/or flowable. This imparts strength to the adhesive during the setting process and decreases the open/close time.

The hot melt adhesive (particularly pressure sensitive adhesive) may further comprise an oil or other plasticizer, such as an amorphous polyolefin. Oils are typically employed to reduce the viscosity of the hot melt adhesive. When employed, oils will be present in an amount less than 25, preferably less than 15, and more preferably less than 10 weight percent, based on the weight of the hot melt adhesive. Exemplary classes of oils include white mineral oil (such as Kaydol™ (available from Witco), and Shellflex™ 371 naphthenic oil (available from Shell Oil Company). To the extent that the oil decreases the adhesion character of the hot melt adhesive to levels detrimental for the contemplated use, they should not be employed.

The hot melt adhesives of the invention may be prepared by standard melt blending procedures. In particular, heteromorphic polymer composition, optional tackifier, optional wax, and optional plasticizer, may be melt blended at an elevated temperature (from 150 to 200° C.) under an inert gas blanket until a homogeneous mix is obtained. Any mixing method producing a homogeneous blend without degrading the hot melt components is satisfactory, such as through the use of a heated vessel equipped with a stirrer. Further, the heteromorphic polymer composition, optional wax, optional tackifier, and optional plasticizer may be provided to an extrusion coater for application to the substrate.

Suitable pressure sensitive adhesives will exhibit a probe tack of at least 200 grams, more preferably at least 300 grams, and most preferably at least 350 grams. Suitable pressure sensitive adhesives will further exhibit a heat resistance which is at least 10° C., preferably at least 15° C., and more preferably at least 20° C. greater than that of pressure sensitive adhesives in which the branch polymer and backbone polymer are employed as a blend rather than in the form of the heteromorphic polymer compositions of the invention.

Suitable adhesives will be of a low enough viscosity to permit facile application on the desired substrate. Typically, hot melt adhesives will have a melt viscosity at 350° F. (177° C.) which is less than 50,000 centipoise (50,000 g/cm·sec), with lower viscosities being typically more preferred.

The applications of the heteromorphic polymer compositions of this invention (particularly those wherein at least one of the backbone polymer or the branch polymer is functionalized with a polar moiety) will further include, but are not limited to, gaskets such as those in automobile windows, sealants, adhesive, flexible molded goods such as shoes soles, wire and cable insulation and jacketing, roofing membranes, floor coverings, hoses, boots, automobile parts, and other parts known to the industry to require elastomeric materials with adhesion to polar substrates.

The following Examples, which set forth representative heteromorphic polymer compositions of the invention, are provided for the purpose of illustration, rather than limitation.

Polymers Used in the Preparation of the Compositions of the Examples

In each case, the patents referenced in the description are incorporated herein by reference.

Polymer A1—a substantially linear ethylene octene copolymer prepared in accordance with the teachings of U.S. Pat. No. 5,278,236, which had a measured $I_2$ of 0.94 g/10 min. and density of 0.869 g/cm$^3$.

Polymer A2—a substantially linear ethylene octene copolymer prepared in accordance with the teachings of U.S. Pat. No. 5,278,236, which had a measured $I_2$ of 3.86 g/10 min. and a density of 0.867 g/cm$^3$.

Polymer A3—a substantially linear ethylene octene copolymer prepared in accordance with the teachings of U.S. Pat. No. 5,278,236, which had a measured $I_2$ of 23.79 g/10 min. and a density of 0.867 g/cm$^3$.

Polymer A4—a substantially linear ethylene/octene copolymer prepared in accordance with the teachings of U.S. Pat. No. 5,278,236, which had an $I_2$ of 30 g/10 min. and density of 0.870 g/cm$^3$.

Polymer A5—a substantially linear ethylene/octene copolymer prepared in accordance with the teachings of U.S. Pat. No. 5,278,236, which had a density of 0.870 g/cm$^3$ and an $I_2$ of 18 g/10 min Polymer A6—a substantially linear ethylene octene copolymer prepared in accordance with the teachings of U.S. Pat. No. 5,278,236, which had a measured $I_2$ of 1 g/10 min. and density of 0.855 g/cm$^3$.

Polymer A7—is a substantially linear ethylene/1-octene copolymer prepared in accordance with the teachings of U.S. Pat. No. 5,278,236, which had a density of 0.855 g/cm3 and a melt index of 30 g/10 min.

Polymer A8—is an ultralow molecular weight ethylene/1-octene copolymer prepared in accordance with the teachings of U.S. Pat. No. patent application Ser. No. 784,683, filed Jan. 22, 1997 (WO 97/01181), having a density of 0.855 g/cm$^3$ and a melt viscosity at 350° F. (177° C.) of 350 centipoise (350 g/cm·sec)

Polymer A9—is a substantially linear ethylene/1-octene copolymer prepared in accordance with the teachings of U.S. Pat. No. 5,278,236, which had a density of 0.855 g/cm$^3$ and a melt index of 0.5 g/10 min.

Polymer A10—is a substantially linear ethylene/1-octene prepared in accordance with the teachings of U.S. Pat. No. 5,278,272, which had a density of 0.870 g/cm$^3$ and a melt index of 30 g/10 min.

Polymer B1—HDPE 55500—an ethylene/butene copolymer supplied by Phillips Petroleum, which had a measured $I_2$ of 49 g/10 min., and a density of 0.955 g/cm$^3$.

Polymer B2—Marlex 50–100 high density polyethylene having a density of 0.952 g/cm$^3$ and an $I_2$ of 0.08 g/10 min., available from Phillips.

Polymer B3—Dowlex™ 25355 high density polyethylene having a density of 0.955 g/cm$^3$ and an $I_2$ of 25 g/10 min.

Polymer B4—Dowlex™ 25455 high density polyethylene having a density of 0.955 g/cm$^3$ and an $I_2$ of 25 g/10 min.

Polymer B5—a substantially linear ethylene/1-octene copolymer prepared in accordance with the teachings of U.S. Pat. No. 5,278,236, which has a density of 0.902 g/cm$^3$ and a melt index of 30 g/10 min.

Polymer B6—a substantially linear ethylene/1-octene copolymer prepared in accordance with the teachings of U.S. Pat. No. 5,278,236, which has a density of 0.913 g/cm$^3$ and a melt index of 30 g/10 min.

Polymer B7—Attane™ 6152 ultralow density polyethylene, a heterogeneous linear ethylene/1-octene copolymer having a density of 0.904 g/cm$^3$ and a melt index of 0.5 g/10 min.

Polymer B8—Ultralow molecular weight ethylene/1-octene copolymer prepared in accordance with the teachings of U.S. Pat. No. patent application Ser. No. 784,683, filed Jan. 22, 1997 (WO 87/01181) having a density of 0.955 g/cm$^3$ and a melt viscosity at 350° F. (177° C.) of 5000 centipoise (5000 g/cm·sec).

Polymer B9—Dow high density polyethylene HDPE 12165, having a density of 0.955 g/cm$^3$ and a melt index of 1.0 g/cm$^3$.

Polymer B10—Dow high density polyethylene HDPE 25355, having a density of 0.955 g/cm$^3$ and a melt index of 10 g/10 min.

Polymer C: an in-reactor polymer mixture prepared in accordance with the procedure of WO 94/17112, which has as its targeted composition: 68.5 wt. percent of a substantially linear ethylene/octene copolymer having a density of 0.861 g/cm$^3$ and an $I_2$ of 0.29 g/10 min. and 31.5 wt. percent of a high density polyethylene having a density of 0.946 g/cm$^3$ and an $I_2$ of 370 g/10 min.

Polymer D—a maleic anhydride grafted high density polyethylene having a density of 0.953 g/cm$^3$, a melt index of 9 g/10 min, and 1.2 weight percent maleic anhydride prepared by reactive extrusion of high density polethylene having a density of 0.953 g/cm$^3$ with maleic anhydride.

Lupersol 500R (99 percent pure dicumylperoxide, available from Elf Atochem). Lupersol —130 (90–95 percent of 2,5-dimethyl-2,5-di(t-butylperoxy)hexyne-3, available from Elf Atochem). Lupersol-101 2,5-dimethyl-2,5-di(t-butylperoxy)hexane (available from Elf Atochem).

Test Methods Used in Evaluating Compositions of the Examples and Comparative Examples Under load service temperature (ULST) is measured using a thermomechanical analyzer (TMA). The penetration versus temperature was measured. Temperature at the probe penetration of 1 mm is taken as under load softening temperature. A heating rate of 5° C./min and a load of 102 g was used.

A Rheometrics Solids Analyzer Model RSAII was used to determine the change in modulus with respect to temperature. Samples were compression molded into approx. 0.25 mm thick films by holding at 1500 psi (10.3 MPa) and 350° F. (177° C.) for 5 minutes, then cooling at 27° F./min (−2.8° C./min) until 90° F. (32° C.). Samples were held at 90° F. (32° C.) for 1 minute and then removed from the press. A specimen of approx. 0.25×4.4×22 mm was cut, then tested under the following conditions: 10 rad/sec frequency in torsion rectangular test, beginning at −145° C. and increasing to 120° C. or 150° C. or 270° C. at a 5° C. step size with a 30 second soak time for each step, in nitrogen atmosphere.

Gel content is determined by xylene extraction according to ASTM D 2785, Procedure A.

Stress and strain at 23° C. and 70° C. are measured in accordance with ASTM D-1708. The values in parentheses are stress and strain at 70° C.

Hardness shore A is measured in accordance with ASTM D2240.

Ultimate tensile strength was measured in accordance with ASTM D-1708 using microtensile bars.

Melt viscosity is determined in accordance with the following procedure using a Brookfield Laboratories DVII+ Viscometer in disposable aluminum sample chambers. The spindle used is a SC-31 hot-melt spindle, suitable for measuring viscosities in the range of from 10 to 100,000 centipoise (10 to 100,000 g/cm·sec). A cutting blade is employed to cut samples into pieces small enough to fit into the 1 inch (2.5 cm) wide, 5 inches (12.5 cm) long sample chamber. The sample is placed in the chamber, which is in turn inserted into a Brookfield Thermosel and locked into place with bent needle-nose pliers. The sample chamber has a notch on the bottom that fits the bottom of the Brookfield Thermosel to ensure that the chamber is not allowed to turn when the spindle is inserted and spinning. The sample is heated to 350° F. (177° C.), with additional sample being added until the melted sample is about 1 inch (2.5 cm) below the top of the sample chamber. The viscometer apparatus is lowered and the spindle submerged into the sample chamber. Lowering is continued until brackets on the viscometer align on the Thermosel. The viscometer is turned on, and set to a shear rate which leads to a torque reading in the range of 30 to 60 percent. Readings are taken every minute for about 15 minutes, or until the values stabilize, which final reading is recorded.

EXAMPLES 1–3

Determination of Amount of Branch Polymer Which Reacts in the Formation of Hetermorphic Polymer Compositions of the Invention A Haake Rheocord System 40 torque rheometer with a Rheomix 600 mixer and roller style mixing blades was used to prepare the compositions of these Examples. Blends were prepared by mixing the components at 75 revolutions per minute at 145° C. The compositions of Polymers A2, A3, and B are set forth above. Lupersol 500 (99 percent pure dicumyl peroxide, available from Elf Atochem) was added in the indicated amount and the resultant mixture was mixed for approximately 1 minute at 145° C., the temperature was raised to 175° C., and the sample mixed for a total of 15 minutes. Samples were placed on a cool compression molding platen while still hot and compressed to a thin film for FTIR analysis of vinyl content.

The FTIR analysis of representative compositions of the invention are set forth in Table One.

TABLE ONE

Vinyl Analysis of Examples 1–3

| Example # | Description | Vinyls/ 1000 C before peroxide | Vinyls/ 1000 C after peroxide | percent Vinyls Reacted |
|---|---|---|---|---|
| 1 | 40.2 g of 50/50 blend of Polymer A3 and Polymer B1 + 0.20 g Lupersol 500R | 0.448 | 0.167 | 63 |
| 2 | 40.2 g of 50/50 blend of Polymer A2 and Polymer B1 + 0.20 g Lupersol 500R | 0.735 | 0.206 | 72 |
| 3 | 40.2 g of 50/50 blend of Polymer A3 and Polymer B1 + 0.50 g Lupersol 500 R | 0.636 | 0.069 | 89 |

TABLE ONE-continued

Vinyl Analysis of Examples 1–3

| Example # | Description | Vinyls/ 1000 C before peroxide | Vinyls/ 1000 C after peroxide | percent Vinyls Reacted |
|---|---|---|---|---|

The reduction in vinyl endgroup concentration may be considered an indication of the extent to which "T" links formed. Since hydrogen extractability from the Polymer A2 and A3 can be assumed to be of approximately equal probability as hydrogen extractability from Polymer B 1, since most of the vinyl groups are on the lower molecular weight Polymer B 1 than on the higher molecular weight Polymers A2 and A3 (given that a 50:50 blend of the polymer components was used), it may be assumed that approximately 50 percent of the "T" links formed were due to grafting of Polymer B1 to Polymers A2 and A3. The strong reduction in vinyl concentration shown in Table One is further evidence of the formation of "T" links. The appending of the higher crystallinity polymer B1 onto the backbone is supported by the dramatic improvement in temperature resistance as described in the following examples.

EXAMPLES AND COMPARATIVE EXAMPLES 4–18

Improvement in Temperature Resistance Exhibited by Heteromorphic Polymer Compositions of the Invention A Haake Rheocord System 40 torque rheometer with a Rheomix 3000E mixer and roller style mixing blades was used. Samples were prepared by melt blending Polymer B1 and the applicable of Polymers A1, A2, and A3 resin together at 60 to 75 revolutions per minute and approximately 145° C. for approximately 4 minutes. Lupersol 500R (99 percent pure dicumyl peroxide, available from Elf Atochem) was added in the indicated amount. The mixer speed was raised to approximately 160 revolutions per minute to rapidly mix in the peroxide, thereby causing a viscous heating effect, which, over the course of 1–2 minutes, raised the temperature of the mixture to approximately 190° C., causing the decomposition of the peroxide. The mixer speed was reduced to 60 revolutions per minute for an additional minute. Following mixing, the mixer was stopped and the sample removed and allowed to cool. The chunks of polymer were then granulated.

TABLE TWO

| | Polymer A1 | Polymer A2 | Polymer A3 | Polymer B1 | Sample density (g/cm³)--Without peroxide/with peroxide | Sample melt index ($I_{10}$) (g/10 min)-- Without peroxide/ with peroxide | Maximum Temperature* (° C.)--Without peroxide/ with peroxide | Percent Elongation Without peroxide/ with peroxide | Ultimate Tensile Strength (psi (MPa))-- Without peroxide/with peroxide |
|---|---|---|---|---|---|---|---|---|---|
| Comp. Ex. 4a/Comp. Ex. 4b | 100 | 0 | 0 | 0 | 0.8714/0.8716 | 6.33/0 | 65/65 | 946/272 | 1720/1177 (11.86/8.115) |
| Comp. Ex. 5/Ex. 5 | 75 | 0 | 0 | 25 | 0.8931/0.8887 | 16.24/0 | 125/135 | 892/427 | 2839/1966 (19.57/13.56) |
| Comp. Ex. 6/Ex. 6 | 50 | 0 | 0 | 50 | 0.9132/0.9060 | 44.52/0 | 90/>150 | 790/423 | 2904/2585 (20.02/17.82) |
| Comp. Ex. 7/Ex. 7 | 25 | 0 | 0 | 75 | 0.9329/0.9239 | 118.06/0 | 130/>150 | 812/437 | 2614/3020 (18.02/20.82) |
| Comp. Ex. 8a/Comp. Ex. 8b | 0 | 100 | 0 | 0 | 0.8697/0.8698 | 33.08/0.58 | 55/65 | 1317/1048 | 1628/1635 (11.23/11.27) |
| Comp. Ex. 9/Ex. 9 | 0 | 75 | 0 | 25 | 0.8898/0.8882 | 61.44/0.23 | 110/>120 | 1218/756 | 1875/2307 (12.93/15.91) |
| Comp. Ex. 10/Ex. 10 | 0 | 50 | 0 | 50 | 0.9109/0.9058 | 113.13/0 | 80/110 | 1089/621 | 2335/2845 (16.10/19.62) |
| Comp. Ex. 11/Ex. 11 | 0 | 25 | 0 | 75 | 0.9328/0.9240 | 196.61/0 | 95/127 | 50/482 | 2662/3036 (18.35/20.93) |
| Comp. Ex. 12a/Comp. Ex. 12b | 0 | 0 | 100 | 0 | 0.8683/0.8687 | 145.44/11.1 | 50/55 | 1341/1285 | 1164/1238 (8.025/8.536) |
| Comp. Ex. 13/Ex. 13 | 0 | 0 | 95 | 5 | 0.8739/0.8738 | 140.68/9.07 | 105/115 | 1496/1253 | 910/1099 (6.28/7.577) |
| Comp. Ex. 14/Ex. 14 | 0 | 0 | 85 | 15 | 0.8818/0.8812 | 167.84/3.39 | 85/115 | 1385/961 | 953/1312 (6.57/9.046) |
| Comp. Ex. 15/Ex. 15 | 0 | 0 | 75 | 25 | 0.8890/0.8877 | 203.17/1.33 | 70/130 | 790/895 | 936/1680 (6.453/11.58) |
| Comp. Ex. 16/Ex. 16 | 0 | 0 | 50 | 50 | 0.9103/0.9066 | 232.37/0.28 | 75/127 | 715/865 | 1790/2700 (12.34/18.62) |
| Comp. Ex. 17/Ex. 17 | 0 | 0 | 25 | 75 | 0.9317/0.9249 | 276.52/0.1 | 115/128 | 761/656 | 2306/2923 (15.90/20.15) |
| Comp. Ex. 18a/Comp. Ex. 18b | 0 | 0 | 0 | 100 | 0.9547/0.9410 | 350.25/0.04 | 130/>120 | 17/67 | 2253/3367 (15.53/23.22) |

--* Maximum Temperature is the approximate temperature where the RSA modulus (E') curve drops below $10^6$ dyn/cm² (0.1 MPa)
-- Some of the first run samples were only tested to 120° C. If there were no failures, these are indicated with >120.

Table Two shows that the blend of Comparative Example 15, that is, the blend which was not subjected to peroxide treatment, failed at approximately 70° C. Due to the melting of the crystallites of Polymer A3, the blend did not have sufficient strength to maintain its integrity in the RSA test and the sample specimen broke. In contrast, the heteromorphic polymer composition of Example 15, that is, the composition which was subjected to peroxide treatment, maintained its integrity up to 130° C., which is approximately the melting point of Polymer B1.

Table Two summarizes the results for a series of comparative blend compositions (prepared without peroxide treatment) and a series of heteromorphic polymer compositions of the invention (prepared with peroxide treatment). Table Two shows that the heteromorphic compositions of the invention had significantly improved temperature resistance as compared to the comparative blends. Further, Table Two shows that the pure Polymers A1, A2, and A3, which were treated with peroxide, additionally failed at relatively low temperatures. Thus, the substantial improvement in temperature resistance for the heteromophic polymer compositions of the invention cannot be attributed to the formation of a crosslinked network, but is rather attributable to the appending of the high melting point Polymer B 1 branches onto the backbone formed by Polymers A1, A2, and A3.

EXAMPLES 19–23

Effect of Peroxide on Physical Properties of Heteromorphic Polymer Compositions

The heteromorphic polymer compositions of the Comparative Examples and Examples 19–23 were prepared in accordance with the procedures set forth above in Examples 1–4. The compositions of the heteromorphic polymer compositions and comparative blends, and the resultant properties are set forth in the following Table Three.

TABLE THREE

| Example | Comp. Ex. | Ex. 20 | Ex. 21 | Ex. 22 | Ex. 23 | Comp. Ex 24 | Ex. 25 |
|---|---|---|---|---|---|---|---|
| Formulation | | | | | | | |
| Polymer A3 (wt percent) | 75 | 75 | 75 | 70 | 80 | 0 | 0 |
| Polymer B2 (wt percent) | 25 | 25 | 25 | 30 | 20 | 0 | 0 |
| Polymer C (wt percent) | 0 | 0 | 0 | 0 | 0 | 100 | 100 |
| Lupersol 500R (wt percent) | 0 | 0.3 | 0.5 | 0.5 | 0.5 | 0 | 0.5 |
| Properties | | | | | | | |
| ULST (° C.) | 73 | 100 | 120 | 130 | 80 | 80 | 120 |
| Gel (percent) | 0.5 | | | | | | |
| Stress (psi (MPa)) | 730/60 (5.03/0.41) | 1800/220/180 (12.4/1.52/1.24) | 4300/560/250 (29.6/3.86/1.72) | 1900/700/470 (13.1/4.83/3.24) | 1800/260/200 (12.4/1.79/1.38) | ND | ND |
| Strain (percent) | 1400/20 | 1200/360/330 | 480/150/130 | 290/120/120 | 1000/330/215 | ND | ND |

TABLE THREE-continued

| Example | Comp. Ex. | Ex. 20 | Ex. 21 | Ex. 22 | Ex. 23 | Comp. Ex 24 | Ex. 25 |
|---|---|---|---|---|---|---|---|
| 23/70/100° C. Hardness (Shore A) at room temperature | 85 | 86 | 87 | 91 | 85 | 85 | 86 |

Figure 3:
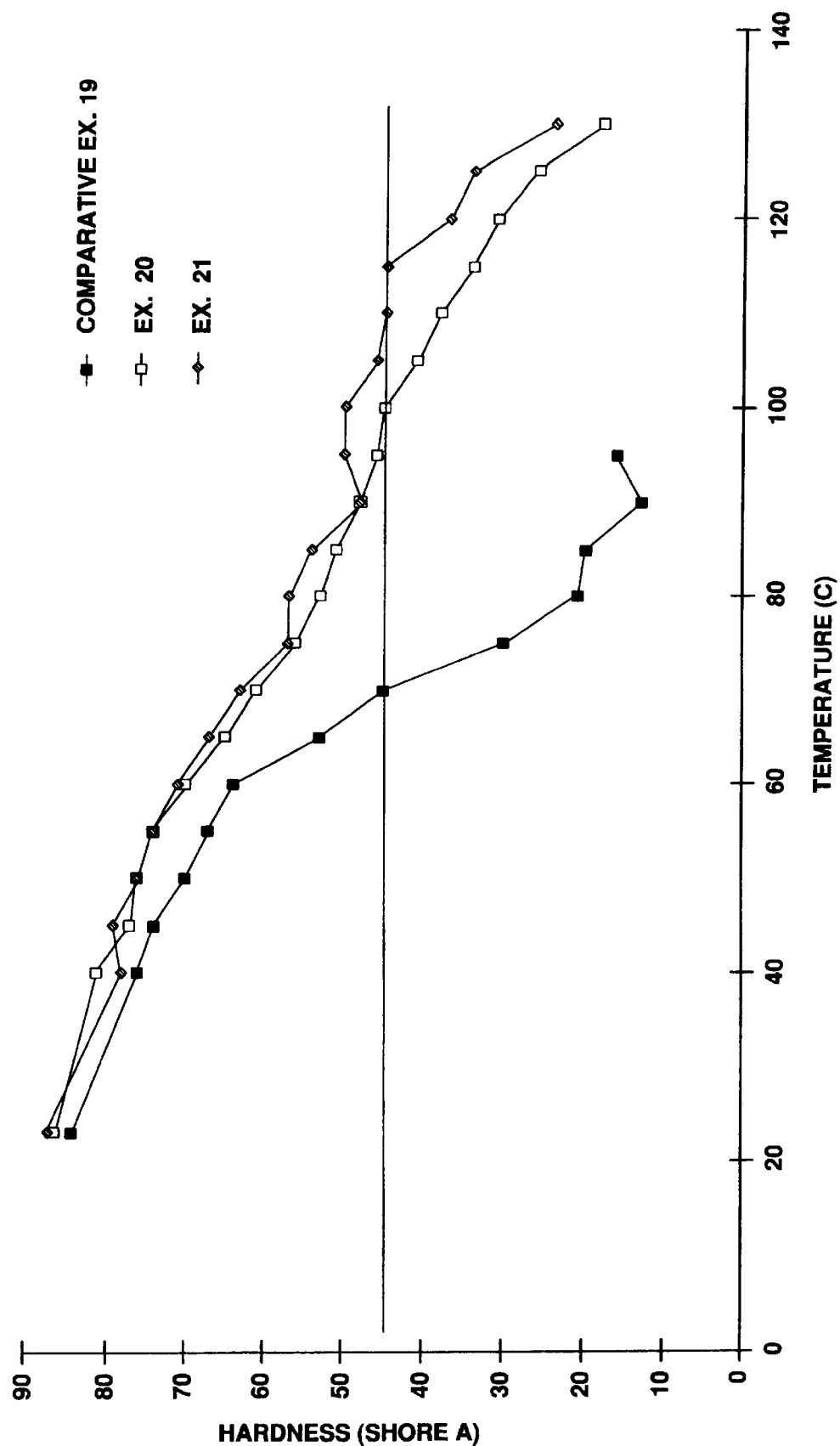
FIG. 3 is a graphical depiction of heat resistance in terms of hardness (Shore A) over range of temperatures (°C) of the compositions of Examples 20 and 21 compared to the blend of Comparative Example 19.
Figure 4:
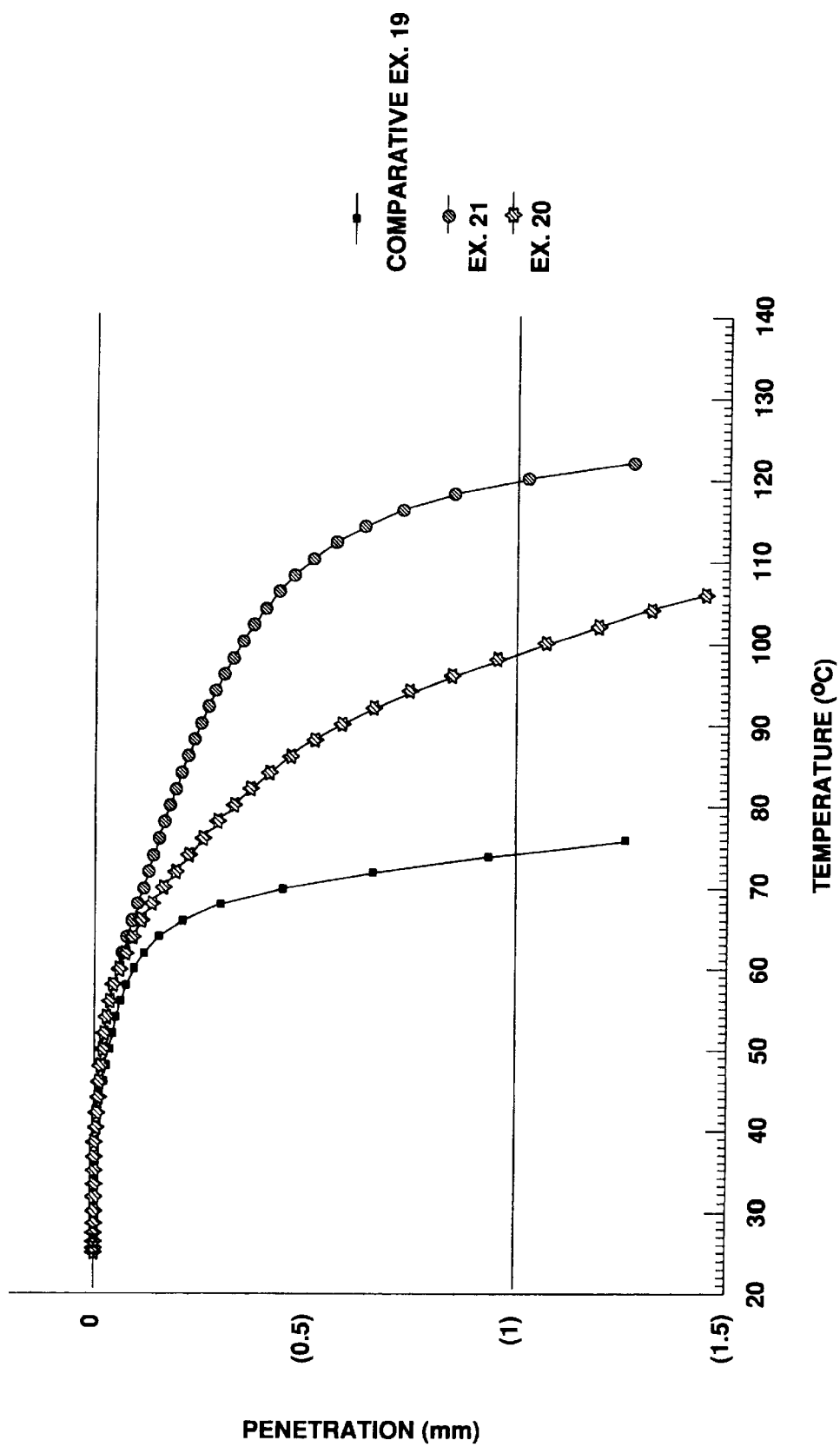
FIG. 4 is a graphical depiction of heat resistance in terms of probe penetration (mm) over range of temperatures (°C) of the compositions of Example 20 and 21 compared to the blend of Comparative Example 19 (probe force=IN (102 am).

Discussion of Examples 19–21. With respect to Examples 19–21, as the amount of peroxide was increased, the under load service temperature likewise increased, by 27° C. in the case of Example 20, and 47° C. in the case of Example 21. The results shown in Table Three show that the heteromorphic polymer compositions of the invention of Examples 20 and 21 have a much higher heat resistance than the corresponding comparative blend of Comparative Example 19. This is set forth in FIG. 3, which shows that the heteromorphic polymer compositions of Examples 20 and 21 withstand a temperature before the hardness shore A drops below 45 than does Comparative Example 19. This is further shown in FIG. 4, which shows that the heteromorphic polymer compositions of Examples 20 and 21undergo 1 mm probe penetration at higher temperatures than does Comparative Example 19.

Table Three further indicates that the heteromorphic polymer compositions have tensile properties at elevated temperatures which exceed those of the comparative blends of Comparative Example 19. For instance, the blend of Comparative Example 19 lost most of its tensile strength at 70° C. In contrast, the heteromorphic polymer compositions of Examples 20 and 21 exhibited a tensile strength at 100° C. of 250 psi (1.72 MPa) and 180 psi (1.24 MPa), respectively.

Moreover, the gel contents of the heteromorphic polymer compositions of Examples 20–21 are less than that of partially crosslinked blends of the prior art, see, for instance, U.S. Pat. No. 3,806,558, incorporated herein by reference, which discloses a gel content of greater than 30 percent. It is surprising that the heteromorphic polymer compositions exhibit such a large improvement in high temperature properties without a large reduction in flexibility and softness, and without the formation of significant amounts of a crosslinked network structure.

Discussion of Examples 21–23. With respect to Examples 21–23, the under load service temperature increased as the concentration of the higher crystallinity branch-forming polymer increased. It is interesting to note that as between Examples 23 and 21, an increase in the amount of the higher crystallinity material from 20 to 25 weight percent yielded an increase in under load service temperature of 40° C.

Discussion of Examples 24–25. Examples 24 and 25 illustrate the fact that in-reactor produced mixtures of the higher crystallinity polymer and the lower crystallinity polymer can beneficially be made into heteromorphic compositions of the invention. It is noted that the heteromorphic polymer composition of Example 25 exhibited an under load service temperature which was 40° C. greater than that of the non-reacted in-reactor mixture of Comparative Example 24. Transmission Electron Micrograph (TEM) analysis of Heteromonphic Polymer Compositions of Examples and Comparative Examples 19–20 and 24–25:

The heteromorphic polymer compositions and comparative blends were compression molded to disks with dimensions of 1 inch (2.5 cm) inner diameter and 1/16 inch (0. 16 cm) thickness at a molding temperature of 177° C., then cooled to 22° C. at a rate of 15° C./minute before demolding.

Thin strips of the compression molded samples were embedded in Epofix (Struer's epoxy based embedding kit) at room temperature. After trimming the blocks, these were stained in a mixture of ruthenium trichloride and Clorox™ bleach for two hours at room temperature. Ultrathin sections of approximately 1000 angstroms in thickness were collected at room temperature using a Reichert-Jung Ultracut E microtome. The sections were placed on formvar coated copper grids. The sections were viewed using a JEOL 2000FX TEM operated at 100 kV accelerating voltage and a magnification of 30,000 times.

Digital analysis of the TEM images was performed on a Leica Quantimet 570 grayscale analyzer. Grayscale images were imported through a CCD camera with amplifier gain and zero set individually for each image. Binary images containing the dispersed phase and individual lamellae were created by grayscale threshholding. These binaries were morphologically opened with horizontal and vertical operators of size 1 to remove individual lamellae from the matrix. Background noise was removed by a morphological opening with a disc of size 2. Manual editing was then performed to correct residual mistakes. For a description of the image transformations used, see "Image Analysis and Mathematical Morphology", Vol.1, by Jean Serra, Academic Press (1982), incorporated herein by reference.

The digital image analyzer measured eight diameters on each dispersed phase and total area fraction from the binaries. Statistical diameters were calculated from the average diameter of each dispersed phase. These statistical diameters convey information about the phase size and breadth of the size distribution. The volume weighted mean diameter emphasized the presence of large features, while the harmonic mean diameter emphasized small features.

Figure 5:
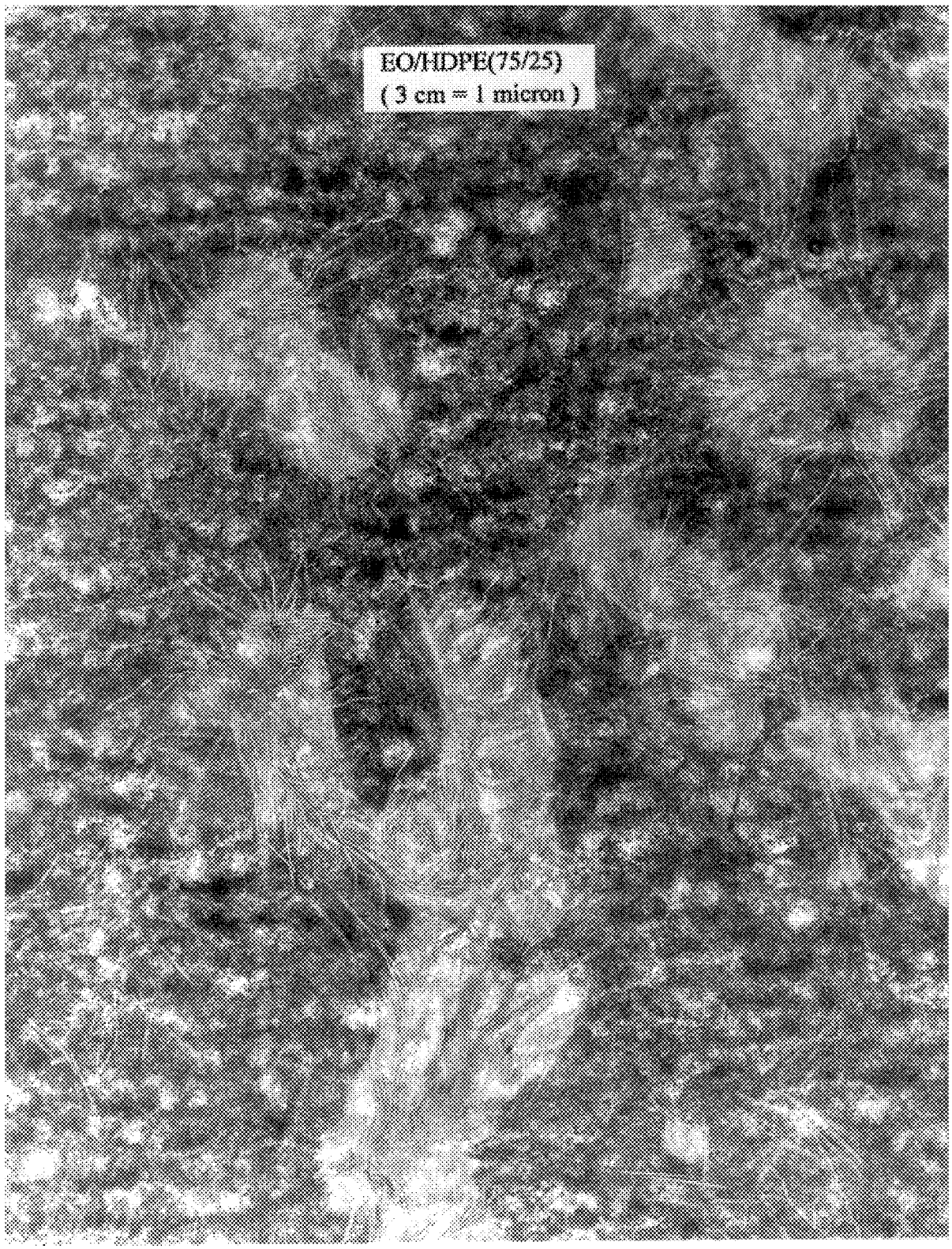
FIG. 5 is a transmission electron microscopy (TEM) image of the comparative polymer blend of Comparative Example 19 at 30, 000 X magnification ( E)/HDPE (75/25); 3 cm=1 microm.
Figure 6:
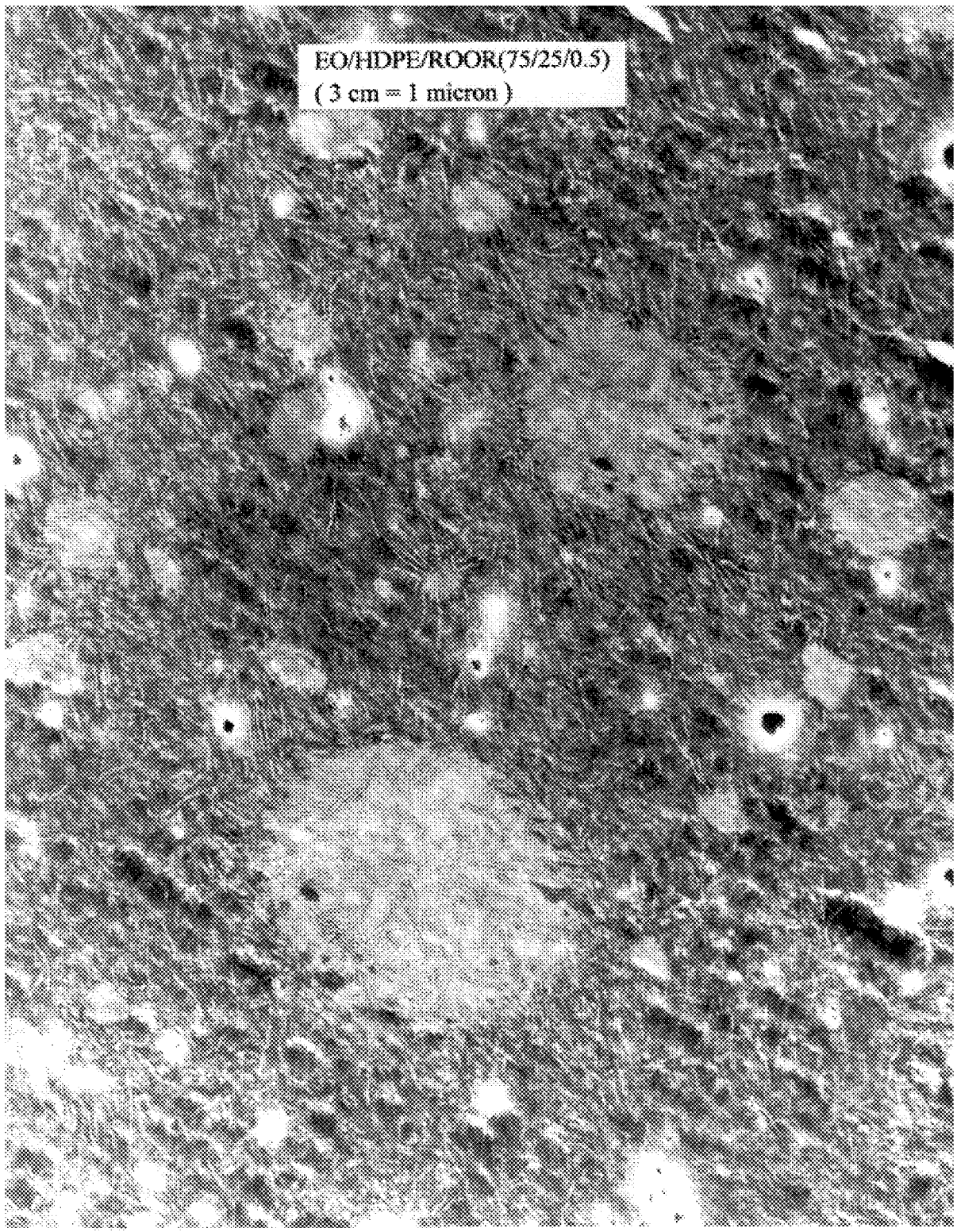
FIG. 6. is a TEM image of the heteromorphic polymer composition of Example at 30,000× magnification (EO/HDPE/ROOR (75/25/0.5); 3 cm=1 micron).
Figure 7:
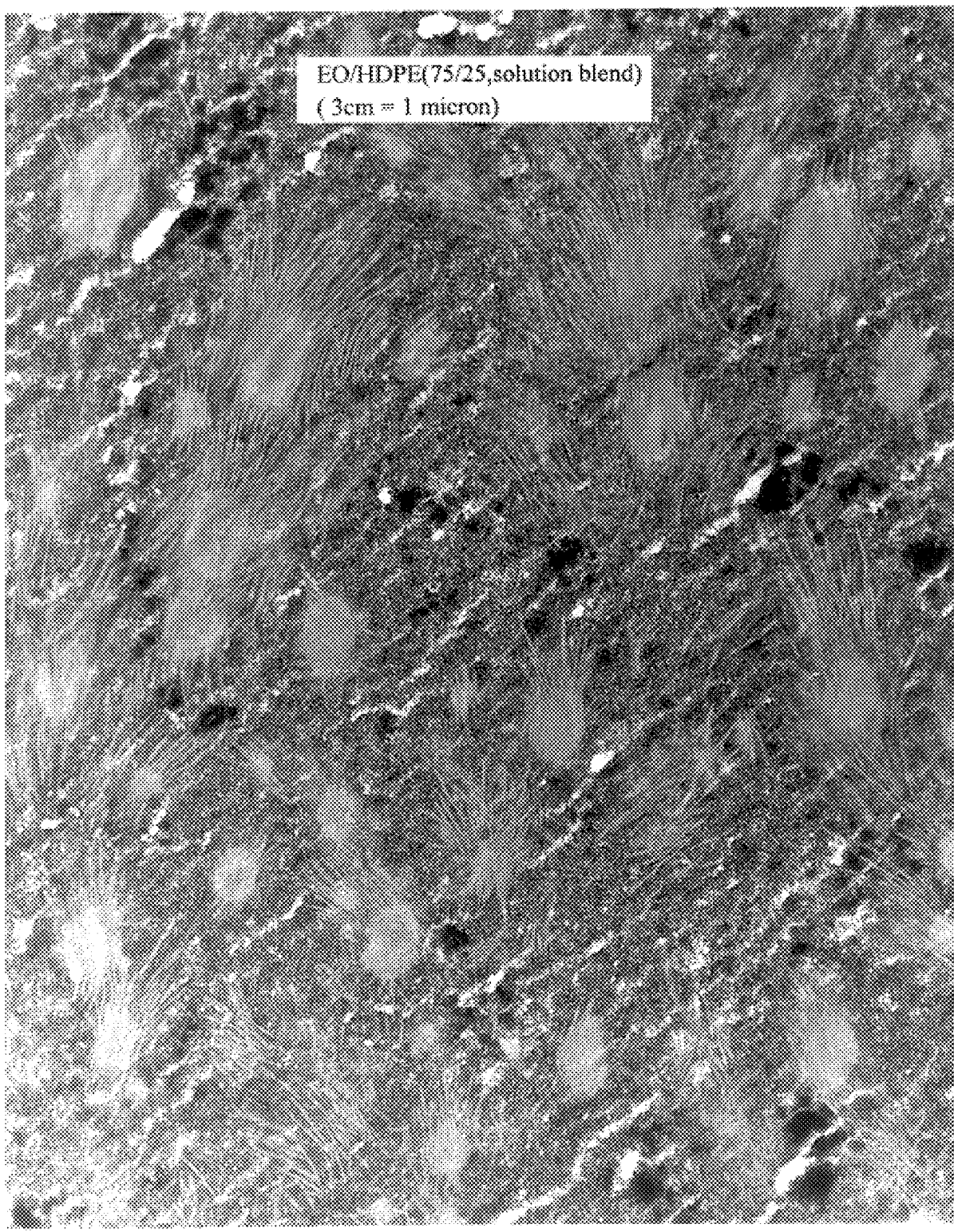
FIG. 7 is a TEM image of the comparative blend of Comparstive Example 24 at 30,000× magnification (EO/HDPE (75/25), solution blend; 3 cm=1 micron).
Figure 8:
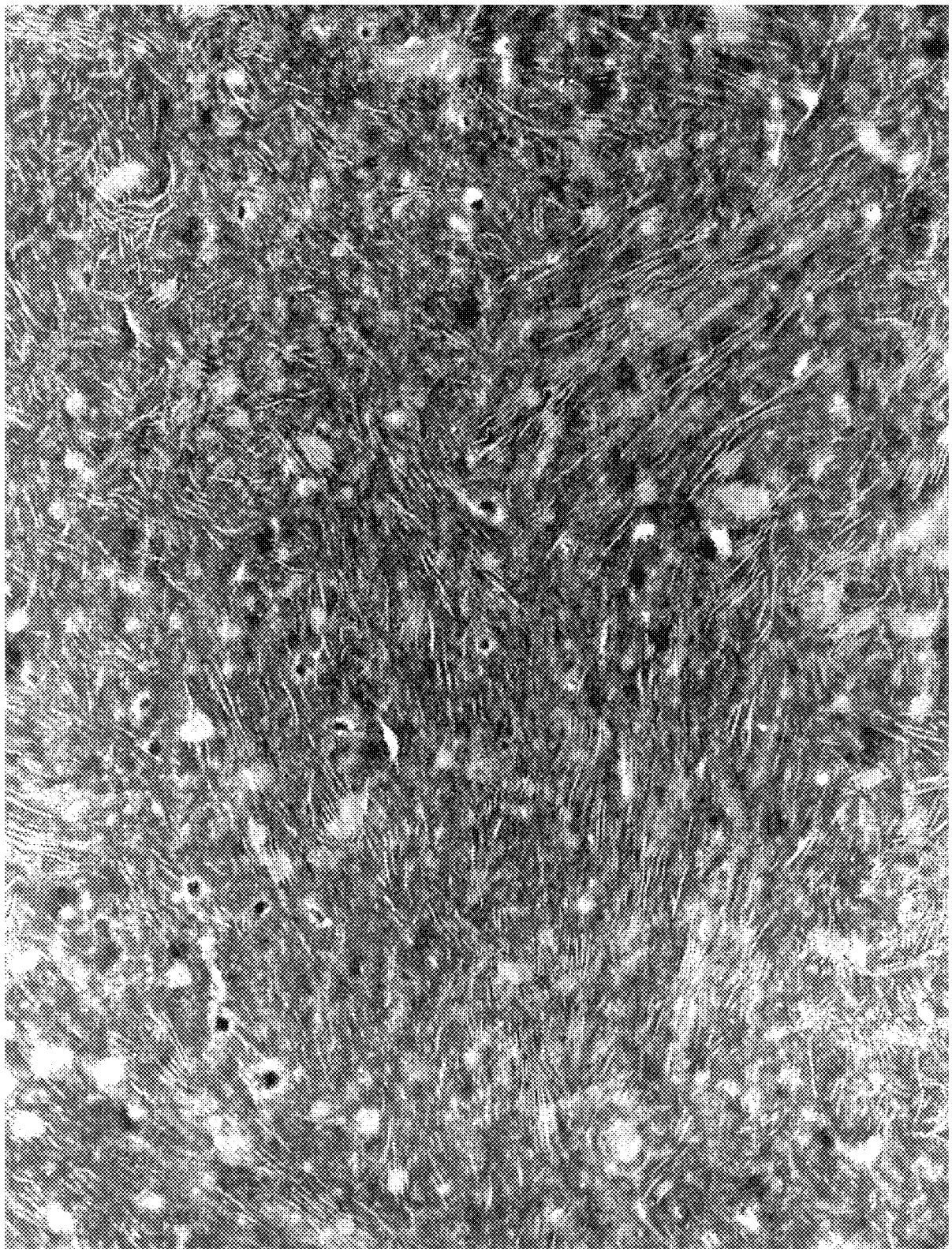
FIG. 8 is a TEM image of the comparative blend of the Comparative Example 25 at 30,000× magnification.

The TEM image of Comparative Example 19 is shown in FIGS. 5, at 30,000 times magnification. The micrograph shows a two phase morphology consisting of dispersed higher density polyethylene domains in a continuous matrix of the elastomer phase attributable to Polymer A3. The domains attributable to the higher density polyethylene component of Polymer B2 are distinguished by their lamellar morphology both within and radiating outwards into the matrix. The elastomer phase attributable to the lower density polyethylene component of Polymer A3 shows the characteristic granular morphology of fringed micelle crystallites. In contrast, the TEM image of heteromorphic polymer composition of Example 20 is shown in FIG. 6, at 30,000 times magnification. While the micrograph shows a two phase morphology, the average domain size of the dispersed higher density polyethylene phase attributable to Polymer B2 is significantly reduced over that of FIG. 5. The good dispersion of lamellae in the elastomer phase is consistent with the belief that the higher density polyethylene component of Polymer B2 is grafted on the elastomer backbone formed by Polymer A3. The TEM images of Comparative Example 24 and Example 25, at 30,000 times magnification, are set forth in FIGS. 7 and 8.

The volume fraction of the dispersed high density polyethylene phase was determined by digital image analysis. The volume and size of the high density polyethylene dispersed phase in the comparative blends and in the heteromorphic polymer compositions is set forth in the following Table Four:

TABLE FOUR

| Sample | Volume percent | Harmonic Mean | Mean Diameter | Volume Mean |
|---|---|---|---|---|
| Comp. Ex. 19 | 19.2 | 0.25 | 0.52 | 1.96 |
| Comp. Ex. 24 | 24.9 | 0.13 | 0.36 | 1.43 |
| Ex. 20 | 8.1 | 0.19 | 0.26 | 1.53 |
| Ex. 25 | 8.0 | 0.18 | 0.20 | 0.34 |

As set forth in Table Five, the heteromorphic polymer compositions of Example 20 of the invention exhibited over 50 percent fewer higher crystallinity island s (as evidenced by a significantly lower volume percent) than the unreacted blends of Comparative Examples 19. Similarly, the heteromorphic polymer compositions of Example 25 of the invention exhibited 67 percent fewer higher crystallinity islands (as evidenced by a significantly lower volume percent) than the unreacted blends of Comparative Examples 24. This suggests that the heteromorphic compositions of the invention in fact comprise elastomer backbones to which the higher density polymer component has been grafted.

An average of the volume percent of Comparative Examples 19 and 24 is 22.1 percent. The average of the volume percent of Examples 20 and 25 is 8. On this basis, it is estimated that 64 percent of the total high density polyethylene is grafted onto the elastomer backbone.

EXAMPLES 26 AND 27

Heteromorphic Ethylene Polymers for Pressure Sensitive Adhesives

The following polymers are utilized in preparing the heteromorphic polymer compositions of this example:

Samples were prepared by melt blending Polymers A6 and D in the indicated amounts in a Haake Rheocord System 40 torque rheometer with a Rheomix 3000E mixer and roller style mixing blades a t 60 to 75 revolutions per minute and approximately 145° C. for approximately 4 minutes. Lupersol™ 101 (available from Elf Atochem) was added in the indicated amount, and the mixer speed was raised to approximately 160 revolutions per minute to rapidly mix it in and to cause a viscous heating effect, and over the course of 1–2 minutes, raising the temperature to approximately 190° C. to decompose the peroxide. The mixer speed was reduced to 60 revolutions per minute for an additional minute. Following mixing, the mixer was stopped and the sample removed and allowed to cool. The chunks of polymer were then granulated.

The resultant heteromorphic polymers and a comparative polymer blend were tested for performance as a pressure sensitive adhesive for tape. The following adhesive formulations were employed: 100 phr resin, 220 phr Escorez 1310 LC tackifier, and 1 phr Irganox™ 1010. The formulation components were melt blended at 130° C. in a Haake. Upon achieving a uniform mixture, 80 phr Kaydol oil was added via a syringe. The tape samples were prepared by compression molding the formulated adhesives between Mylar™ film and a release sheet at 170° C. under 20,000 psi (138 MPa) of pressure. The resultant thickness of the adhesive was about 2 mil (0.05 mm).

Heat resistance of the formulated adhesive was measured using a Rheometrics, Inc., RDA-II dynamic mechanical spectrometer. The temperature at which the storage modulus (G') of the rubber plateau decreased suddenly was taken as the heat resistance temperature. A temperature sweep was run from approximately −70° C. to 200° C. at 5° C./step with 30 seconds equilibration delay at each step. The oscillatory frequency was 1 radian/second with an autostrain function of 0.1 percent strain initially, increasing in positive 100 percent adjustments whenever the torque decreased to 4 gram-centimeters. The maximum strain was set at 26 percent. The 7.9 mm parallel plates fixtures were used with an initial gap of 1.5 mm at 160° C. (the sample was inserted into the RDA-II at 160° C.). The "HOLD" function was engaged at 160° C. and the instrument was cooled to −70° C. and the test started, which corrects for the thermal expansion or contraction as the test chamber is heated or cooled. A nitrogen environment was maintained throughout the experiment to minimize oxidative degradation.

Probe tack was measured in accordance with ASTM D-2979-71, using a dwell time of 10 seconds and a probe separation rate of 1 cm/sec.

Viscosity at 177° C. was measured in accordance with the following procedure using a Brookfield Laboratories DVII+ Viscometer in disposable aluminum sample chambers. The spindle used is SC-31 hot melt spindle. The samples were cut into pieces small enough to fit into the 1 inch (2.5 cm) wide, 5 inches (12.5 cm) long sample chamber. The sample was heated to 177° C., with the melted sample is about 1 inch (2.5 cm) below the top of the sample chamber. The viscometer apparatus is lowered and the spindle submerged into the sample chamber. The viscometer was turned on, and set to a shear rate which leads to a torque reading in the range of 30 to 60 percent. Readings were taken every minute for about 15 minutes, or until the values stabilize, which final reading is recorded.

The heteromorphic polymer compositions and comparative polymers, properties thereof, and performance as pressure sensitive adhesive formulations, is set forth in Tables Five through Seven.

TABLE FIVE

| Sample | Polymer A6--amount present in heteromorphic polymer or comparative blend (phr) | Polymer D-- amount present in heteromorphic polymer or comparative blend (phr) | Peroxide-- amount present in heteromorphic polymer or comparative blend (phr) | ULST of heteromorphic polymer or comparative blend (° C.) | Probe tack of adhesive formulation (grams) | Heat resistance of adhesive formulation (° C.) | Viscosity at 177° C. of adhesive formulation (centipoise) ((g/cm•sec)) |
|---|---|---|---|---|---|---|---|
| 21-1 | 78 | 22 | 0.5 | 115 | 380 | 110 | 46,000 (46,000) |
| 21-2 | 78 | 22 | 0 | 58 | 630 | 80 | 42,000 (42,000) |
| Scotch Magic | — | — | — | Unavailable | 370 | Unavailable | Unavailable |

TABLE FIVE-continued

| Sample | Polymer A6--amount present in heteromorphic polymer or comparative blend (phr) | Polymer D-- amount present in heteromorphic polymer or comparative blend (phr) | Peroxide-- amount present in heteromorphic polymer or comparative blend (phr) | ULST of heteromorphic polymer or comparative blend (° C.) | Probe tack of adhesive formulation (grams) | Heat resistance of adhesive formulation (° C.) | Viscosity at 177° C. of adhesive formulation (centipoise) ((g/cm·sec)) |
|---|---|---|---|---|---|---|---|
| Tape | | | | | | | |

The results in Table Five indicates that the heteromorphic polymers can be used as a pressure sensitive adhesive: the sample has an acceptable processability, probe tack (comparable with commercially available Scotch Magic Tape), and higher service temperature than the comparative blend.

TABLE SIX

Composition of Heteromorphic Polymer Compositions 26–39

| Example | Identity of First Polymer (back- bone) | Identity of Second Polymer (Branch) | First Polymer (phr) | Second Polymers (phr) | Lupersol 101 (phr) |
|---|---|---|---|---|---|
| 26 | A6 | B4 | 78.0 | 22.0 | 0.5 |
| 27 | A6 | B4 | 70.0 | 30.0 | 0.5 |
| Comp Ex 27 | A6 | B4 | 70.0 | 30.0 | 0 |
| 28 | A6 | B5 | 70.0 | 42.6 | 0.7 |
| Comp Ex 28 | A6 | B5 | 70.0 | 42.6 | 0 |
| 29 | A6 | B5 | 40.0 | 60.0 | 0.5 |
| 30 | A6 | B6 | 70.0 | 30.0 | 0.5 |
| 31 | A6 | B7 | 70.0 | 30.0 | 0.5 |
| 32 | A6 | D | 70.0 | 30.0 | 0.5 |
| 33 | A6 | B5 | 70.0 | 30.0 | 0.5 |
| 34 | A7 | B3 | 78.0 | 22.0 | 1.0 |
| 35 | A8 | B3 | 78.0 | 22.0 | 1.0 |
| 36 | A7 | B8 | 78.0 | 22.0 | 1.0 |
| 37 | A7 | B9 | 78.0 | 22.0 | 1.0 |
| 38 | A7 | B10 | 78.0 | 22.0 | 1.0 |
| 39 | A9/A8 | B3 | 50 phr A9 28 phr A8 | 22.0 | 1.0 |

The TMA data set forth in Table Seven suggests that the upper service temperature of the heteromorphic polymer compositions is higher than the comparative non-grafted samples. Compare, for instance, Examples 21–2 to 21–3, and 21–4 to 21–5. The probe tack results suggest that the compositions of the invention have acceptable tackiness, that is, probe tack values of at least 200 grams, more preferably at least 300 grams, and most preferably at least 380 grams. The G' and Tg data suggest that the heteromorphic polymer compositions may be utilized in pressure sensitive adhesive formulations, that is, they are characterized as having a G' of $10^5$ to $10^6$ dynes/cm$^2$ and a Tg of from −10 to 10° C. The Examples of Table Seven show the flexibility of the technology of this invention, that is, the molecular weight and density of the backbone polymer and branching polymer may changed to make the compositions suitable for use in a variety of pressure sensitive adhesive applications.

EXAMPLES 40–41

Functionalization to Improve Adhesion to Glass

Samples were prepared by reactive extrusion of Polymers A10 and B4 (in the case of Example 40) and Polymer A10 and D (in the case of Example 41). In each case, the mixture of the polymer reactants was imbibed with the peroxide, and the imbibed sample was extruded in a twin screw extruder at 210° C. The resultant compositions were evaluated for upper service temperature, lap shear adhesion, and T-peel shear adhesion.

Lap shear adhesion was determined by compression molding the test resin at 350° F. (177° C.) between two glass

TABLE SEVEN

Pressure Sensitive Adhesives

| Formulation No. | Ex/Comp Ex. of Heteromorphic Polymer | Heteromorphic Polymer (phr) | E1310LC (phr) | Kaydol (phr) | TMA (° C.) | G' at 20° C. (dynes/cm$^2$) | Probe Tack (g) | Tg (° C.) |
|---|---|---|---|---|---|---|---|---|
| 21-1 | 26 | 100.0 | 222.0 | 80.0 | 115 | 3 × 10$^6$ | 430 | −3 |
| 21-2 | 27 | 100.0 | 220.0 | 80.0 | 122 | 2 × 10$^6$ | 380 | 1 |
| 21-3 | Comp Ex 27 | 100.0 | 220.0 | 80.0 | 58 | 3 × 10$^6$ | 540 | 0 |
| 21-4 | 28 | 100.0 | 220.0 | 80.0 | 84 | 3 × 10$^6$ | 380 | −9 |
| 21-5 | Comp Ex 28 | 100.0 | 220.0 | 80.0 | 63 | 7 × 10$^5$ | 400 | 2 |
| 21-6 | 29 | 100.0 | 220.0 | 80.0 | 94 | 2 × 10$^6$ | 200 | 0 |
| 21-7 | 30 | 100.0 | 220.0 | 80.0 | 95 | 1 × 10$^6$ | 300 | 0 |
| 21-8 | 31 | 100.0 | 220.0 | 80.0 | 92 | 6 × 10$^5$ | 380 | 0 |
| 21-9 | 32 | 100.0 | 220.0 | 80.0 | 120 | 3 × 10$^6$ | 320 | 0 |
| 21-10 | 33 | 110.0 | 110.0 | 40.0 | 84 | N/D | N/D | N/D |
| 22-1 | 34 | 100.0 | 220.0 | 80.0 | 117 | 3 × 10$^6$ | N/D | 0 |
| 22-2 | 35 | 100.0 | 220.0 | 80.0 | 75 | 4 × 10$^5$ | N/D | 0 |
| 22-3 | 36 | 100.0 | 220.0 | 80.0 | 84 | 3 × 10$^5$ | N/D | 3 |
| 22-4 | 37 | 100.0 | 220.0 | 80.0 | 108 | 6 × 10$^5$ | N/D | 0 |
| 22-5 | 38 | 100.0 | 220.0 | 80.0 | 109 | 9 × 10$^5$ | N/D | 4 |
| 22-6 | 39 | 100.0 | 220.0 | 80.0 | 95 | N/D | N/D | 5 |

* all formulations were stabilized with 1 phr Irganox ™ 1010 hindered phenolic (available form Ciba Geigy)

microscopy slides, backing the slides with sponge tape, then performing a lap shear pull test on an Instron tensionometer.

T-Peel Shear Adhesion was determined as follows. Glass slides (dimensions: 3×1×0.05 inches (7.6×2.5×0.12 cm) from Fisher Scientific) were bonded to cold rolled steel strips (CRS, dimensions: 6×1×0.032 inches (15×2.5×0.08) from Q-Panel Company) using Loctite Depend Adhesive (Item No 00206, from the Loctite Corporation) by placing a surface activator on the CRS strip and the adhesive resin on the glass slide. Sufficient mixing of the adhesive occurred when the glass slide and CRS were place together. These bonded joints were held together with a 10 pound (22 kg) weight for 10 minutes. The CRS/glass strips were placed on a hot plate (180° C.). The HDPE-g-EO test polymers and second metal strip were placed onto the CRS/glass strips residing on the hot plate. They were heated until the polymer sample had melted. Then they were cooled to room temperature. These test specimens were tested 24 hours after preparation.

The nominal stress-strain diagrams were generated using an Instron 4204 Materials Testing System according to ASTM method D1876-72. The distance between the grips was 2 inches (5 cm), and the crosshead speed was 10 inches/min (25 cm/min).

The heteromorphic polymer compositions and the resultant properties are set forth in the following Table Eight.

TABLE EIGHT

| Sample | Polymer B4 (phr) | Polymer D (phr) | Polymer A10 (phr) | Lupersol 130 peroxide (phr) | USL T (° C.) | Lap shear Adhesion (pounds/linear inch (kg/cm)) | T-Peel Shear Adhesion (pounds/linear inch (k/cm)) |
|---|---|---|---|---|---|---|---|
| HDPE-g-EO(20-1) | 25 | | 75 | 0.5 | 120 | 25 (138) | 0 (0) |
| MAH-g-HDPE-g-EO(14-2) | | 25 | 75 | 0.5 | 120 | 129 (112) | 34 (29) |

The adhesion to glass of the heteromorphic polymer composition significantly increases when MAH-g-HDPE is used instead of HDPE as the branch polymer. The results in Table Eight show that the MAH-g-HDPE grafted heteromorphic composition has much higher lap shear adhesion and T-peel shear Adhesive to glass than the non-functionalized heteromorphic polymer composition.

As set forth above in the discussion of adhesive formulation 21-9, maleic acid functionalized heteromorphic polymer compositions may be usefully employed in pressure sensitive adhesive formulations.

The subject invention, having been fully described and exemplified in detail above, shall be limited only in accordance with the following claims.

What is claimed is:

1. A heteromorphic polymer composition comprising the reaction product of: (a) a homogeneous linear or substantially linear ethylene/α-olefin interpolymer backbone polymer having a density of at least 0.850 g/cm³ and of less than 0.920 g/cm³; and (b) a branch appending from the backbone, which branch comprises an ethylene homopolymer or ethylene/α-olefin interpolymer having a density which is at least 0.004 g/cm³ greater than that of the backbone.

2. The heteromorphic polymer composition of claim 1, wherein the branch is characterized as comprising an ethylene homopolymer or ethylene/α-olefin interpolymer having a density which is at least 0.006 g/cm³ greater than that of the backbone.

3. The heteromorphic polymer composition of claim 1, wherein the polymer backbone is further characterized as a homogeneous linear or substantially linear interpolymer of ethylene and at least one $C_3$–$C_{20}$ α-olefin.

4. The heteromorphic polymer composition of claim 3, wherein the homogeneous linear or substantially linear interpolymer of the backbone is further characterized as having a CDBI of at least 50 and an $M_w/M_n$ of less than 3.

5. The heteromorphic polymer composition of claim 1, wherein the interpolymer of the backbone is characterized as a substantially linear interpolymer characterized as having:

(a) a melt flow ratio, $I_{10}/I_2 \geq 5.63$, (b) a molecular weight distribution, $M_w/M_n$ as determined by gel permeation chromatography and defined by the equation:

$$(M_w/M_n) \leq (I_{10}/I_2) - 4.63,$$

(c) a critical shear stress at the onset of gross melt fracture, as determined by gas extrusion rheometry, of greater than $4 \times 10^6$ dynes/cm² (0.4 MPa) or a gas extrusion rheology such that the critical shear rate at onset of surface melt fracture for the substantially linear ethylene interpolymer is at least 50 percent greater than the critical shear rate at the onset of surface melt fracture for a linear ethylene polymer, wherein the substantially linear ethylene interpolymer and the linear ethylene polymer comprise the same comonomer or comonomers, the linear ethylene polymer has an $I_2$, $M_w/M_n$ and density within ten percent of the substantially linear ethylene interpolymer and wherein the respective critical shear rates of the substantially linear ethylene interpolymer and the linear ethylene polymer are measured at the same melt temperature using a gas extrusion rheometer, and (d) a single differential scanning calorimetry, DSC, melting peak between –30 and 150° C.

6. The heteromorphic polymer composition of claim 1, wherein the interpolymer of the backbone is characterized as a substantially linear ethylene/α-olefin interpolymer which is substituted with an average of 0.01 to 3 long chain branches/1000 carbons.

7. A heteromorphic polymer composition comprising a reacted product of (a) from 40 to 5 weight percent of a branch-forming polymer, which branch comprises an ethylene homopolymer or ethylene/α-olefin interpolymer, and (b) from 60 to 95 weight percent of a backbone-forming material which is ethylene and one or more comonomers or which is a homogeneous linear or substantially linear ethylene/α-olefin interpolymer;

wherein the crystallinity the resultant branch is at least 5 percent greater than the crystallinity of the resultant backbone; and wherein the heteromorphic polymer composition has an upper service temperature which is at least 10° C.

greater than a non-reacted blend of the polymer of the resultant branch and the polymer of the resultant backbone.

8. A heteromorphic polymer composition of claim 1, further characterized as comprising moieties derived from the grafting of a polar moiety onto at least one of the backbone polymer or the branch polymer.

9. A heteromorphic polymer composition of claim 7, further characterized as comprising moieties derived from the grafting of a polar moiety onto at least one of the backbone polymer or the branch polymer.

10. A process for preparing a heteromorphic polymer composition, wherein the process is characterized as comprising:

(a) polymerizing ethylene and optionally one or more α-olefin comonomers under reaction conditions to form a branch-forming polymer; and (b) polymerizing ethylene, one or more α-olefin comonomers, and the branch-forming polymer of (a) under reaction conditions to form the heteromorphic polymer composition, wherein the heteromorphic polymer composition is characterized as having a backbone polymer portion and an appending branch polymer portion, wherein the crystallinity at room temperature of the branch polymer portion is at least 5 percent greater than that of the backbone polymer portion.

11. The process of claim 10, wherein the polymerizing of (a) occurs in a first reactor and the polymerizing of (b) occurs in a second reactor, or wherein the polymerizing of (a) occurs in the same reactor as the polymerizing of (b), and wherein a first catalyst is employed during the polymerizing of (a) and a second compatible catalyst is employed during the polymerizing of (b).

12. A process for preparing a heteromorphic polymer composition, wherein the process is characterized as comprising:

(a) polymerizing ethylene and optionally one or more α-olefin comonomers under reaction conditions to form a reaction stream containing a branch-forming polymer;

(b) polymerizing ethylene and one or more α-olefin comonomers to form a reaction stream containing a homogeneous linear or substantially linear backbone-forming polymer, (c) optionally isolating the branch-forming polymer from the reaction stream of (a) and the backbone-forming polymer from the reaction stream of (b), and (d) reacting the branch-forming polymer and the backbone-forming polymer, in the presence of a free radical initiator, to append the branch-forming polymer to the backbone-forming polymer to produce the heteromorphic polymer composition;

wherein the branch-forming polymer has a crystallinity at room temperature which is at least 5 percent greater than that of the backbone-forming polymer.

13. The process of claim 12, wherein the reacting of step (d) occurs prior to isolation of the branch-forming polymer and the backbone-forming polymer from the reaction streams of (a) and (b), and the process further comprises:

(e) isolating the heteromorphic polymer composition from the combined reaction stream.

14. The heteromorphic composition of claim 1 in the form of an adhesive, sealant, coating, molded part, film, thermoformed part, or fiber.

15. The hetermorphic composition of claim 14, in the form of a hot melt adhesive formulation.

16. The heteromorphic composition of claim 15, wherein the hot melt adhesive formulation is characterized as having a probe tack of at least 200 grams and an upper service temperature which is at least 10° C. greater than that of a hot melt adhesive comprising a non-reacted blend of the branch polymer and backbone polymer provided in equal amounts as is present in the heteromorphic polymer composition.

* * * * *